(12) United States Patent
Li

(10) Patent No.: US 11,838,883 B2
(45) Date of Patent: Dec. 5, 2023

(54) TRANSMISSION CONFIGURATION METHOD AND DEVICE

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 243 days.

(21) Appl. No.: 17/261,333

(22) PCT Filed: Jul. 25, 2018

(86) PCT No.: PCT/CN2018/097101
§ 371 (c)(1),
(2) Date: Jan. 19, 2021

(87) PCT Pub. No.: WO2020/019216
PCT Pub. Date: Jan. 30, 2020

(65) Prior Publication Data
US 2021/0329575 A1 Oct. 21, 2021

(51) Int. Cl.
*H04W 56/00* (2009.01)
*H04B 7/06* (2006.01)
(Continued)

(52) U.S. Cl.
CPC ........ *H04W 56/001* (2013.01); *H04B 7/0626* (2013.01); *H04L 5/0051* (2013.01); *H04W 74/008* (2013.01); *H04W 74/0841* (2013.01)

(58) Field of Classification Search
CPC ............ H04W 56/001; H04W 74/008; H04W 74/0841; H04B 7/0626; H04L 5/0051
See application file for complete search history.

(56) References Cited

U.S. PATENT DOCUMENTS

2016/0315684 A1* 10/2016 Tian ...................... H04L 1/0026
2018/0027554 A1    1/2018 Yerramalli et al.
(Continued)

FOREIGN PATENT DOCUMENTS

CN 108092754 A 5/2018
CN 108235444 A 6/2018
(Continued)

OTHER PUBLICATIONS

International Search Report dated Apr. 26, 2019 in PCT/CN2018/097101 (submitting English translation only), 2 pages.
(Continued)

*Primary Examiner* — Deepa Belur
(74) *Attorney, Agent, or Firm* — Oblon, McClelland, Maier & Neustadt, L.L.P.

(57) ABSTRACT

The present disclosure provides a transmission configuration method and device. The method is applied to a terminal, and comprises: determining a specified message used to trigger a base station to configure a transmission configuration indication (TCI) state set for the terminal; and transmitting the specified message to the base station in a random access process, such that the base station configures the TCI state set according to the specified message. Accordingly, the present disclosure can improve transmission configuration efficiency and reduce time delay.

20 Claims, 19 Drawing Sheets

(51) Int. Cl.
  *H04L 5/00* (2006.01)
  *H04W 74/00* (2009.01)
  *H04W 74/08* (2009.01)

(56) References Cited

U.S. PATENT DOCUMENTS

| | | | |
|---|---|---|---|
| 2018/0206132 | A1 | 7/2018 | Guo et al. |
| 2020/0045709 | A1* | 2/2020 | Seo ................. H04W 72/53 |
| 2021/0022144 | A1* | 1/2021 | Shi ................. H04W 56/001 |
| 2021/0037575 | A1* | 2/2021 | Ohara ............... H04L 5/0053 |
| 2021/0168742 | A1* | 6/2021 | Li ................... H04W 76/27 |
| 2021/0234752 | A1* | 7/2021 | Matsumura .......... H04B 7/0695 |
| 2021/0243794 | A1* | 8/2021 | Li ................... H04L 5/0094 |
| 2022/0046690 | A1* | 2/2022 | Lee ................. H04L 1/1864 |
| 2022/0386139 | A1* | 12/2022 | Wu .................. H04W 24/10 |

FOREIGN PATENT DOCUMENTS

| | | |
|---|---|---|
| CN | 108260214 A | 7/2018 |
| CN | 108476513 A | 8/2018 |
| WO | WO 2017/127126 A1 | 7/2017 |
| WO | WO 2017/196243 A1 | 11/2017 |
| WO | WO 2018/044594 A1 | 3/2018 |
| WO | WO 2018/067063 A1 | 4/2018 |
| WO | WO 2018/110857 A1 | 6/2018 |
| WO | WO 2018/131945 A1 | 7/2018 |

OTHER PUBLICATIONS

Written Opinion of the International Search Authority dated Apr. 26, 2019 in PCT/CN2018/097101 (submitting English translation only), 4 pages.
"On Beam Management, Measurement and Reporting", Samsung 3GPP TSG RAN WG1 Meeting 91 R1-1720290, Dec. 1, 2017 (Dec. 1, 2017), section 2.1., 15 pages.
"Remaining Details on Beam Indication, Measurement and Reporting", Nokia et al., 3GPP TSG RAN WG1 Meeting Ah1-18, R1-1600751, Jan. 26, 2018 (Jan. 26, 2018), entire document., pp. 1-6.
3GPP TSG-RAN2 NR AH#0218 R2-1809552, Montreal, Canada, Jul. 2-6, 2018, Agenda item: 10.4.1.4.1: Source: Mediatek Inc.; Title: Remove the concept of 'intra-/inter-frequency' from RRM measurement in Connected., 7 pages.
3GPP TSG RAN WG1#91 R1-1720315. Reno. USA, Nov. 27-Dec. 1, 2017, Agenda item: 7.2.3.7: Source: Samsung; Title: Remaining details on QCL., 11 pages.
Combined Chinese Office Action and Search Report dated Mar. 15, 2021 in Chinese Patent Application No. 201880001483.3 (with English translation), 23 pages.
Office Action dated Jan. 14, 2022 in corresponding Indian Patent Application No. 202147005543 (with English Translation), 5 pages.
Office Action dated Nov. 2, 2021 in corresponding Chinese Patent Application No. 201880001483.3 (with English Translation), 4 pages.
Extended European Search Report dated Feb. 16, 2022 in corresponding European Patent Application No. 189279029, 10 pages.
Liu Wei, et al., "Inter-cell collaboration based handover scheme in satellite mobile communication system", Computer Engineering and Design, vol. 36, No. 8, Aug. 2015, 6 pages (with English Abstract).
CHTTL: "Discussion on remaining issues of beam management" 3GPP DRAFT; R1-1807126, 3rd Generation Partnership Project (3GPP), XP051442324, May 21-25, 2018, 5 pages, Retrieved from the Internet: URL: http://www.3gpp.org/ftp/Meetings%5F3GPP%5FSYNC/RAN1/Docs/ [retrieved on May 20, 2018].
Intel Corporation: "On choosing SSB for RACH resource selection" 3GPP DRAFT; R2-1800938 (Resubmission of R2-1712653), 3rd Generation Partnership Project(3GPP), XP051386457, Jan. 12, 2018, 2 page, Retrieved from the Internet: URL: http://www.3gpp.org/ftp/tsg%5FranWG2%5FRL2/TSGR2%5FAHs/2018%5F01%5FNR/Docs/[retrieved on Jan. 12, 2018].
Huawei et al., "Remaining issues in RACH Procedure" 3GPP DRAFT; R1-1717051, 3rd GenerationPa rtnership Project (3GPP), XP051340242, Oct. 8, 2017, 11 pages, Retrieved from the Internet: URL: http://www.3gpp.org/ftp/Meetings_3GPPSYNC/RAN1/Docs/ [retrieved on Oct. 8, 2017].

* cited by examiner

TRANSMISSION CONFIGURATION METHOD AND DEVICE

RELATED APPLICATION

This application claims the benefit of International Application No. PCT/CN CN2018/097101, entitled "Transmission Configuration Method and Device" and filed on Jul. 25, 2018, which is incorporated herein by reference in its entirety.

TECHNICAL FIELD

The present disclosure generally relates to the technical field of communication, including to a method and device of transmission configuration.

BACKGROUND

In a new-generation communication system, since a high-frequency channel is attenuated faster, for ensuring a coverage range, beam-based transmitting and reception is required. Generally, a beam management process is started after a terminal completes random access and Radio Resource Control (RRC) connection with a base station. However, after a random access process is completed, the base station, before configuring a Transmission Configuration Indication (TCI) state set for the terminal, needs to wait for a process of beam measurement configuration, beam measurement and beam measurement reporting. Consequently, a TCI configuration delay is prolonged, such that the terminal cannot timely use the most appropriate receiving beam, and a throughput of the terminal is further influenced.

SUMMARY

Exemplary embodiments of the present disclosure provide a method and device of transmission configuration.

According to a first aspect of the present disclosure, there is provided a method of transmission configuration. The method may be applied to a terminal and can include that a designated message is determined, the designated message being configured to trigger a base station to configure a TCI state set for the terminal, and the designated message is transmitted to the base station in a random access process, such that the base station configures the TCI state set according to the designated message.

Optionally, the operation that the designated message is determined may include that detection is performed within a designated detection window, to obtain one or more first Synchronization Signal Blocks (SSBs) capable of triggering random access, and a first message corresponding to a first SSB and configured to initiate random access is determined as the designated message.

Optionally, the operation that detection is performed within the designated detection window, to obtain the one or more first SSBs capable of triggering random access may include that, responsive to that any SSB meeting a designated received power condition is detected within the designated detection window, the SSB is determined as the first SSB, wherein an SSB detected at the earliest time within the designated detection window and meeting the designated received power condition is determined as an earliest SSB.

Optionally, the operation that detection is performed within the designated detection window, to obtain the one or more first SSBs capable of triggering random access may include that, responsive to that an earliest SSB meeting the designated received power condition is detected within the designated detection window, the earliest SSB is determined as the first SSB, responsive to that any other SSB meeting the designated received power condition is detected within the designated detection window, a difference value between received power of the earliest SSB and a designated offset value is calculated, and, responsive to that received power of the other SSB is greater than the difference value, the other SSB is determined as the first SSB.

Optionally, the method may further include that, responsive to that it is detected that a first designated stopping condition is met, SSB detection is stopped, wherein the first designated stopping condition includes at least one of: all SSBs designated by the base station and need to be detected are detected; a designated number of first SSBs are detected; or there is a need to start monitoring a random access feedback corresponding to random access which is initiated by the earliest SSB.

Optionally, the operation that the designated message is determined may further include that a second message transmitted by the base station for performing random access feedback for a second SSB is received, the second SSB being any one of the first SSBs, one or more first Channel State Information Reference Signals (CSI-RSs) corresponding to the second SSB are measured according to a set measurement rule, to obtain a first measurement report, and the first measurement report is added to a first set message which is configured to represent contention resolution, and the first set message is determined as the designated message.

Optionally, the operation that the designated message is determined may further include that one or more third SSBs are selected from the first SSBs according to a set selection rule, one or more second CSI-RSs corresponding to a third SSB are measured according to a set measurement rule, to obtain a second measurement report, and the second measurement report is added to a second set message which is configured to represent contention resolution, and the second set message is determined as the designated message. Further, the set selection rule may include sequentially selecting according to a descending order of received power of SSBs.

Additionally, the operation that the designated message is determined may include that one or more fourth SSBs designated by the base station for measurement and one or more third CSI-RSs corresponding to a fourth SSB are measured according to a set measurement rule, to obtain a third measurement report, and the third measurement report is added to a third set message which is configured to represent contention resolution, and the third set message is determined as the designated message.

The operation that the designated message is determined may further include that one or more fourth CSI-RSs capable of triggering random access are detected within the designated detection window, and a first message corresponding to a fourth CSI-RS and configured to initiate random access is determined as the designated message.

Optionally, the operation that the one or more fourth CSI-RSs capable of triggering random access are detected within the designated detection window may include that an earliest SSB meeting a first designated received power condition is detected within the designated detection window, and, responsive to that any fifth CSI-RS meeting a second designated received power condition is detected within the designated detection window, a first difference value between received power of the earliest SSB and the designated offset value is calculated. Further, the operation can further include received power of the fifth CSI-RS is regulated according to a designated transmitted power difference value between an SSB and a CSI-RS, to obtain regulated received power, and, responsive to that the regulated received power is greater than the first difference value, the fifth CSI-RS is determined as the fourth CSI-RS.

The method may further include that, responsive to that it is detected that a second designated stopping condition is met, SSB detection and CSI-RS detection are stopped, wherein the second designated stopping condition includes at least one of: all SSBs and CSI-RSs designated by the base station and need to be detected are detected; a designated number of first SSBs and fourth CSI-RSs are detected; or there is a need to start monitoring a random access feedback corresponding to random access which is initiated by the earliest SSB.

Further, the operation that the designated message is determined may further include that, according to the set measurement rule, one or more fifth SSBs and one or more sixth CSI-RSs are determined, and the fifth SSBs and the sixth CSI-RSs are measured to obtain a fourth measurement report, and the fourth measurement report is added to a fourth set message which is configured to represent contention resolution, and the fourth set message is determined as the designated message.

The method may include that a system message transmitted by the base station is received, the system message including the set measurement rule. The set measurement rule includes a measurement object, the measurement object including one or more SSBs designated by the base station for measurement and/or one or more CSI-RSs corresponding to each SSB designated for measurement, a measurement triggering condition, the measurement triggering condition including a designated measurement triggering threshold value, and a configuration of a measurement report, the configuration of the measurement report including a designated content of the measurement report, or the configuration of the measurement report including the designated content of the measurement report and a designated transmission resource of the measurement report.

Optionally, the method may further include that a fourth message, which is transmitted by the base station and configured to represent that contention resolution is successful, is received, and RRC signaling transmitted by the base station is received, the RRC signaling including a first TCI state set for Physical Downlink Control Channel (PDCCH) reception and/or a second TCI state set for Physical Downlink Shared Channel (PDSCH) reception, which are/is configured for the terminal by the base station, wherein the first TCI state set includes a first corresponding relationship between a TCI state identifier for PDCCH reception and at least one of an SSB identifier or a CSI-RS identifier, and the second TCI state set includes a second corresponding relationship between a TCI state identifier for PDSCH reception and at least one of an SSB identifier or a CSI-RS identifier.

The first TCI state set may include at least two TCI state identifiers, and the method may further include that first Media Access Control (MAC) Control Element (CE) signaling transmitted by the base station is received, the first MAC CE signaling being configured to activate a first TCI state identifier, wherein the first TCI state identifier is a TCI state identifier selected from the first TCI state set by the base station, and the first TCI state identifier is configured for the terminal to determine a receiving beam needs to be adopted when a PDCCH is received from the base station. The method can further include that a first SSB identifier corresponding to the first TCI state identifier and/or a first CSI-RS identifier corresponding to the first TCI state identifier are/is determined according to the first corresponding relationship, and, when the PDCCH is received, a first receiving beam which is same as that receiving an SSB designated by the first SSB identifier and/or a CSI-RS designated by the first CSI-RS identifier is adopted.

The second TCI state set may include N TCI state identifiers, N being greater than 1, and the method may further include that second MAC CE signaling transmitted by the base station is received, the second MAC CE signaling being configured to activate M TCI state identifiers, wherein the M TCI state identifiers are configured for PDSCH reception, and the M TCI state identifiers are selected from the N TCI state identifiers by the base station.

Optionally, M may be greater than 1, and the method may further include that Downlink Control Information (DCI) signaling transmitted by the base station is received, the DCI signaling being configured to indicate a second TCI state identifier, wherein the second TCI state identifier is configured for receiving PDSCH which is scheduled by the DCI signaling, and the second TCI state identifier is a TCI state identifier selected from the M TCI state identifiers by the base station. The method can further include that a second SSB identifier corresponding to the second TCI state identifier and/or a second CSI-RS identifier corresponding to the second TCI state identifier are/is determined according to the second corresponding relationship, and, when a PDSCH scheduled by the DCI signaling is received, s second receiving beam which is same as that receiving an SSB designated by the second SSB identifier and/or a CSI-RS designated by the second CSI-RS identifier is adopted.

According to a second aspect of the embodiments of the present disclosure, there is provided a method of transmission configuration. The method may be applied to a base station and include that a designated message transmitted by a terminal in a random process is received, the designated message being a message transmitted by the terminal to trigger the base station to configure a TCI state set, and the TCI state set is configured according to the designated message.

Optionally, the designated message may include respective first messages corresponding to one or more first SSBs and configured to initiate random access, and a first SSB may be an SSB detected by the terminal within a designated detection window and capable of triggering random access.

Further, the designated message may also include a first set message carrying a first measurement report and configured to represent contention resolution, the first measurement report may be a measurement report which is obtained after the terminal measures one or more first CSI-RSs corresponding to a second SSB, and the second SSB may be one of the first SSBs corresponding to each first message which is configured for the base station to perform random access feedback.

Optionally, the designated message may also include a second set message carrying a second measurement report and configured to represent contention resolution, the second measurement report may be a measurement report which is obtained after the terminal measures one or more second CSI-RSs corresponding to each of one or more third SSBs, and a third SSB may be selected from respective first SSBs by the terminal.

Additionally, the designated message may include a third set message carrying a third measurement report and configured to represent contention resolution, and the third measurement report may be a measurement report obtained after the terminal measures one or more fourth SSBs and one or more third CSI-RSs corresponding to a fourth SSB, which are designated by the base station for measurement, according to a set measurement rule.

Optionally, the designated message may also include respective first messages corresponding to one or more fourth CSI-RSs and configured to initiate random access, and a fourth CSI-RS may be a CSI-RS detected by the terminal within the designated detection window and capable of triggering random access.

Optionally, the designated message may also include a fourth set message carrying a fourth measurement report and configured to represent contention resolution, and the fourth measurement report may be a measurement report which is obtained after the terminal determines one or more fifth SSBs and one or more sixth CSI-RSs and measures the fifth SSBs and the sixth CSI-RSs according to the set measurement rule.

Optionally, the method may further include that the set measurement rule is added to a system message, and the system message is transmitted to the terminal, wherein the set measurement rule includes a measurement object, the measurement object including one or more SSBs designated by the base station for measurement and/or one or more CSI-RSs corresponding to each SSB designated for measurement, a measurement triggering condition, the measurement triggering condition including a designated measurement triggering threshold value, and a configuration of a measurement report, the configuration of the measurement report including a designated content of the measurement report, or the configuration of the measurement report including the designated content of the measurement report and a designated transmission resource of the measurement report.

Optionally, the operation that the TCI state set is configured according to the designated message may include that a first TCI state set for PDCCH reception and/or a second TCI state set for PDSCH reception are/is configured for the terminal according to the designated message, wherein the first TCI state set includes a first corresponding relationship between a TCI state identifier for PDCCH reception and at least one of an SSB identifier or a CSI-RS identifier, and the second TCI state set includes a second corresponding relationship between a TCI state identifier for PDSCH reception and at least one of an SSB identifier or a CSI-RS identifier.

Optionally, the method may further include that a fourth message, which is configured to represent that contention resolution is successful, is transmitted to the terminal, and the first TCI state set and/or the second TCI state set are/is added to RRC signaling, and the RRC signaling is transmitted to the terminal.

Optionally, the first TCI state set may include at least two TCI state identifiers, and the method may further include that a TCI state identifier is selected from the first TCI state set, the selected TCI state identifier being a first TCI state identifier, first MAC CE signaling is generated, the first MAC CE signaling being configured to activate the first TCI state identifier, wherein the first TCI state identifier is configured for the terminal to determine a receiving beam needs to be adopted when a PDCCH is received from the base station, and the first MAC CE signaling is transmitted to the terminal.

Optionally, the second TCI state set may include N TCI state identifiers, N being greater than 1. The method may further include that M TCI state identifiers for PDSCH reception are selected from the N TCI state identifiers, second MAC CE signaling is generated, the second MAC CE signaling being configured to activate the M TCI state identifiers, and the second MAC CE signaling is transmitted to the terminal.

Optionally, M may be greater than 1, and the method may further include that DCI signaling is generated, the DCI signaling being configured to indicate a second TCI state identifier, wherein the second TCI state identifier is configured for receiving PDSCH which is scheduled by the DCI signaling, and the second TCI state identifier is a TCI state identifier selected from the M TCI state identifiers by the base station, and the DCI signaling is transmitted to the terminal.

According to a third aspect of the embodiments of the present disclosure, there is provided a device of transmission configuration. The device may be applied to a terminal and include a determination module that is configured to determine a designated message, the designated message being configured to trigger a base station to configure a TCI state set for the terminal, and a transmitting module that is configured to transmit the designated message to the base station in a random access process such that the base station configures the TCI state set according to the designated message.

Optionally, the determination module may include a first detection submodule that is configured to perform detection within the designated detection window, to obtain one or more first SSBs capable of triggering random access, and a first determination submodule that is configured to determine a first message corresponding to a first SSB and configured to initiate random access as the designated message.

Optionally, the first detection submodule may include a second detection submodule that is configured to, responsive to that any SSB meeting a designated received power condition is detected within the designated detection window, determine the SSB as the first SSB, wherein an SSB detected at the earliest time within the designated detection window and meeting the designated received power condition may be determined as an earliest SSB.

Optionally, the first detection submodule may include a third detection submodule that is configured to, responsive to that an earliest SSB meeting the designated received power condition is detected within the designated detection window, determine the earliest SSB as the first SSB, a fourth detection submodule that is configured to, responsive to that any other SSB meeting the designated received power condition is detected within the designated detection window, calculate a difference value between received power of the earliest SSB and a designated offset value, and a second determination submodule that is configured to, responsive to that received power of the other SSB is greater than the difference value, determine the other SSB as the first SSB.

Optionally, the determination module may further include a fifth detection submodule that is configured to, responsive to that it is detected that a first designated stopping condition is met, stop SSB detection. The first designated stopping condition may include at least one of: all SSBs designated by the base station and need to be detected are detected; a designated number of first SSBs are detected; or there is a need to start monitoring a random access feedback corresponding to random access which is initiated by the earliest SSB.

Optionally, the determination module may further include a first receiving submodule that is configured to receive a second message transmitted by the base station for performing random access feedback for a second SSB, the second SSB being any one of the first SSBs, a first measurement submodule that is configured to measure one or more first CSI-RSs corresponding to the second SSB according to a set measurement rule to obtain a first measurement report; and a first addition submodule that is configured to add the first measurement report to a first set message which is configured to represent contention resolution, and also determine the first set message as the designated message.

Optionally, the determination module may further include a selection submodule that is configured to select one or more third SSBs from the first SSBs according to a set selection rule, a second measurement submodule that is configured to measure one or more second CSI-RSs corresponding to a third SSB according to a set measurement rule, to obtain a second measurement report, and a second addition submodule that is configured to add the second measurement report to a second set message which is configured to represent contention resolution, and also determine the second set message as the designated message.

Optionally, the set selection rule may be sequentially selecting according to a descending order of received power of SSBs.

Optionally, the determination module may include a third measurement submodule that is configured to measure one or more fourth SSBs designated by the base station for measurement and one or more third CSI-RSs corresponding to a fourth SSB according to a set measurement rule, to obtain a third measurement report, and a third addition submodule that is configured to add the third measurement report to a third set message which is configured to represent contention resolution, and determine the third set message as the designated message.

Optionally, the determination module may further include a sixth detection submodule that is configured to detect one or more fourth CSI-RSs capable of triggering random access within the designated detection window, and a third determination submodule that is configured to determine a first message corresponding to a fourth CSI-RS and configured to initiate random access as the designated message.

The sixth detection submodule may include a seventh detection submodule that is configured to detect an earliest SSB meeting a first designated received power condition within the designated detection window an eighth detection submodule that is configured to, responsive to that any fifth CSI-RS meeting a second designated received power condition is detected within the designated detection window, calculate a first difference value between received power of the earliest SSB and the designated offset value, a regulation submodule that is configured to regulate received power of the fifth CSI-RS according to a designated transmitted power difference value between an SSB and a CSI-RS to obtain regulated received power, and a fourth determination submodule that is configured to, responsive to that the regulated received power is greater than the first difference value, determine the fifth CSI-RS as the fourth CSI-RS.

Optionally, the determination module may further include a ninth detection submodule that is configured to, responsive to that it is detected that a second designated stopping condition is met, stop SSB detection and CSI-RS detection, wherein the second designated stopping condition may include at least one of: all SSBs and CSI-RSs designated by the base station and need to be detected are detected; a designated number of first SSBs and fourth CSI-RSs are detected; or there is a need to start monitoring a random access feedback corresponding to random access which is initiated by the earliest SSB.

Further, the determination module may further include a fourth measurement submodule that is configured to, according to the set measurement rule, determine one or more fifth SSBs and one or more sixth CSI-RSs and measure the fifth SSBs and the sixth CSI-RSs to obtain a fourth measurement report, and a fourth addition submodule that is configured to add the fourth measurement report to a fourth set message which is configured to represent contention resolution, and determine the fourth set message as the designated message.

Optionally, the device may further include a first receiving module that is configured to receive a system message transmitted by the base station, the system message including the set measurement rule. The set measurement rule may include a measurement object, the measurement object including one or more SSBs designated by the base station for measurement and/or one or more CSI-RSs corresponding to each SSB designated for measurement, a measurement triggering condition, the measurement triggering condition including a designated measurement triggering threshold value, and a configuration of a measurement report, the configuration of the measurement report including a designated content of the measurement report, or the configuration of the measurement report including the designated content of the measurement report and a designated transmission resource of the measurement report.

Optionally, the device may further include a second receiving module that is configured to receive a fourth message transmitted by the base station and configured to represent that contention resolution is successful, and a third receiving module that is configured to receive RRC signaling transmitted by the base station, the RRC signaling including a first TCI state set for PDCCH reception and/or a second TCI state set for PDSCH reception, which are/is configured for the terminal by the base station, wherein the first TCI state set may include a first corresponding relationship between a TCI state identifier for PDCCH reception and at least one of an SSB identifier or a CSI-RS identifier, and the second TCI state set may include a second corresponding relationship between a TCI state identifier for PDSCH reception and at least one of an SSB identifier or a CSI-RS identifier.

The first TCI state set may include at least two TCI state identifiers, and the device may further include a fourth receiving module that is configured to receive first MAC CE signaling transmitted by the base station, the first MAC CE signaling being configured to activate a first TCI state identifier, wherein the first TCI state identifier may be a TCI state identifier selected from the first TCI state set by the base station, and the first TCI state identifier may be configured for the terminal to determine a receiving beam needs to be adopted when a PDCCH is received from the base station, a first determination module that is configured to determine, according to the first corresponding relationship, a first SSB identifier corresponding to the first TCI state identifier and/or a first CSI-RS identifier corresponding to the first TCI state identifier, and a first processing module that is configured to adopt, when receiving the PDCCH, a first receiving beam which is same as that receiving an SSB designated by the first SSB identifier and/or a CSI-RS designated by the first CSI-RS identifier.

The second TCI state set may include N TCI state identifiers, where N is greater than 1. The device may further include a fifth receiving module that is configured to receive second MAC CE signaling transmitted by the base station, the second MAC CE signaling being configured to activate M TCI state identifiers, wherein the M TCI state identifiers may be configured for PDSCH reception, and the M TCI state identifiers may be selected from the N TCI state identifiers by the base station.

Optionally, M may be greater than 1, and the device may further include a sixth receiving module that is configured to receive DCI signaling transmitted by the base station, the DCI signaling being configured to indicate a second TCI state identifier, wherein the second TCI state identifier may be configured for receiving PDSCH which is scheduled by the DCI signaling, and the second TCI state identifier may be a TCI state identifier selected from the M TCI state identifiers by the base station, a second determination module that is configured to determine, according to the second corresponding relationship, a second SSB identifier corresponding to the second TCI state identifier and/or a second CSI-RS identifier corresponding to the second TCI state identifier, and a second processing module that is configured to adopt, when receiving a PDSCH scheduled by the DCI signaling, a second receiving beam which is same as that receiving an SSB designated by the second SSB identifier and/or a CSI-RS designated by the second CSI-RS identifier.

According to a fourth aspect of the embodiments of the present disclosure, there is provided a device of transmission configuration. The device may be applied to a base station and include a receiving module that is configured to receive a designated message transmitted by a terminal in a random process, the designated message being a message transmitted by the terminal to trigger the base station to configure a TCI state set, and a configuration module that is configured to configure the TCI state set according to the designated message.

The designated message may include respective first messages corresponding to one or more first SSBs and configured to initiate random access, and a first SSB may be an SSB detected by the terminal within a designated detection window and capable of triggering random access. Further, the designated message may also include a first set message carrying a first measurement report and configured to represent contention resolution, the first measurement report may be a measurement report which is obtained after the terminal measures one or more first CSI-RSs corresponding to a second SSB, and the second SSB may be one of the first SSBs corresponding to respective first messages which are configured for the base station to perform random access feedback.

Optionally, the designated message may also include a second set message carrying a second measurement report and configured to represent contention resolution, the second measurement report may be a measurement report which is obtained after the terminal measures one or more second CSI-RSs corresponding to each of one or more third SSBs, and a third SSB may be selected from respective first SSBs by the terminal. Also, the designated message may include a third set message carrying a third measurement report and configured to represent contention resolution, and the third measurement report may be a measurement report obtained after the terminal measures one or more fourth SSBs and one or more third CSI-RSs corresponding to a fourth SSB, which are designated by the base station for measurement, according to a set measurement rule.

Optionally, the designated message may also include respective first messages corresponding to one or more fourth CSI-RSs and configured to initiate random access, and a fourth CSI-RS may be a CSI-RS detected by the terminal within the designated detection window and capable of triggering random access. The designated message may also include a fourth set message carrying a fourth measurement report and configured to represent contention resolution, and the fourth measurement report may be a measurement report which is obtained after the terminal determines one or more fifth SSBs and one or more sixth CSI-RSs and measures the fifth SSBs and the sixth CSI-RSs according to the set measurement rule.

Optionally, the device may further include a first transmitting module that is configured to add the set measurement rule to a system message and transmit the system message to the terminal. The set measurement rule may include a measurement object, the measurement object including one or more SSBs designated by the base station for measurement and/or one or more CSI-RSs corresponding to each SSB designated for measurement, a measurement triggering condition, the measurement triggering condition including a designated measurement triggering threshold value, and a configuration of a measurement report, the configuration of the measurement report including a designated content of the measurement report, or the configuration of the measurement report including the designated content of the measurement report and a designated transmission resource of the measurement report.

Optionally, the configuration module may include a configuration submodule that is configured to configure a first TCI state set for PDCCH reception and/or a second TCI state set for PDSCH reception for the terminal according to the designated message, wherein the first TCI state set may include a first corresponding relationship between a TCI state identifier for PDCCH reception and at least one of an SSB identifier or a CSI-RS identifier, and the second TCI state set may include a second corresponding relationship between a TCI state identifier for PDSCH reception and at least one of an SSB identifier or a CSI-RS identifier.

Optionally, the device may further include a second transmitting module that is configured to transmit a fourth message, which is configured to represent that contention resolution is successful, to the terminal, and a third transmitting module that is configured to add the first TCI state set and/or the second TCI state set to RRC signaling and transmit the RRC signaling to the terminal.

Optionally, the first TCI state set may include at least two TCI state identifiers, and the device may further include a first selection module that is configured to select a TCI state identifier from the first TCI state set, the selected TCI state identifier being a first TCI state identifier, a first generation module that is configured to generate first MAC CE signaling, the first MAC CE signaling being configured to activate the first TCI state identifier, wherein the first TCI state identifier may be configured for the terminal to determine a receiving beam needs to be adopted when a PDCCH is received from the base station, and a fourth transmitting module that is configured to transmit the first MAC CE signaling to the terminal.

Optionally, the second TCI state set may include N TCI state identifiers, N being greater than 1. The device may further include a second selection module that is configured to select M TCI state identifiers for PDSCH reception from the N TCI state identifiers, a second generation module that is configured to generate second MAC CE signaling, the second MAC CE signaling being configured to activate the M TCI state identifiers, and a fifth transmitting module that is configured to transmit the second MAC CE signaling to the terminal.

Optionally, M may be greater than 1, and the device may further include a third generation module that is configured to generate DCI signaling, the DCI signaling being configured to indicate a second TCI state identifier, wherein the second TCI state identifier may be configured for receiving PDSCH which is scheduled by the DCI signaling, and the second TCI state identifier may be a TCI state identifier selected from the M TCI state identifiers by the base station, and a sixth transmitting module that is configured to transmit the DCI signaling to the terminal.

According to a fifth aspect of the present disclosure, there is provided a non-transitory computer-readable storage medium, on which a computer program may be stored. The computer program may be configured to execute the method of transmission configuration as described in the first aspect.

According to a sixth aspect of the present disclosure, there is provided a non-transitory computer-readable storage medium, on which a computer program may be stored. The computer program may be configured to execute the method of transmission configuration as described in the second aspect.

According to a seventh aspect of the present disclosure, there is provided a device of transmission configuration. The device may be applied to a terminal and include a processor and a memory configured to store instructions executable for the processor. The processor may be configured to determine a designated message, the designated message being configured to trigger a base station to configure a TCI state set for the terminal, and transmit the designated message to the base station in a random access process, such that the base station configures the TCI state set according to the designated message.

According to an eighth aspect of the embodiments of the present disclosure, there is provided a device of transmission configuration. The device may be applied to a base station and include a processor and a memory configured to store instructions executable for the processor. The processor may be configured to receive a designated message transmitted by a terminal in a random process, the designated message being a message transmitted by the terminal to trigger the base station to configure a TCI state set, and configure the TCI state set according to the designated message.

The technical solutions provided in the embodiments of the present disclosure may have beneficial effects. For example, in the present disclosure, the terminal may determine the designated message configured to trigger the base station to configure the TCI state set for the terminal, and transmit the designated message to the base station in the random access process, such that the base station configures the TCI state set according to the designated message. Therefore, the transmission configuration efficiency is improved, and a delay is reduced. Further, in the present disclosure, the base station may receive the designated message transmitted by the terminal in the random process, the designated message being a message transmitted by the terminal to trigger the base station to configure the TCI state set, and configure the TCI state set according to the designated message, such that the transmission configuration efficiency is improved, and the delay is reduced.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate exemplary embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are apparatuses and methods consistent with aspects related to the present disclosure as recited in the appended claims.

Terms used in the present disclosure are only adopted for the purpose of describing specific embodiments and not intended to limit the present disclosure. "A/an", "said" and "the" in a singular form in the present disclosure and the appended claims are also intended to include a plural form, unless other meanings are clearly denoted throughout the present disclosure. It should also be understood that term "and/or" used in the present disclosure refers to and includes one or any or all possible combinations of multiple associated items that are listed.

It should be understood that, although terms first, second, third, and the like may be adopted to describe various information in the present disclosure, the information should not be limited to these terms. These terms are only adopted to distinguish the information of the same type. For example, without departing from the scope of the present disclosure, indication information may also be called second information and, similarly, second information may also be called indication information. For example, term "if" used here may be explained as "while" or "when" or "responsive to determining", which depends on the context.

Figure 1:
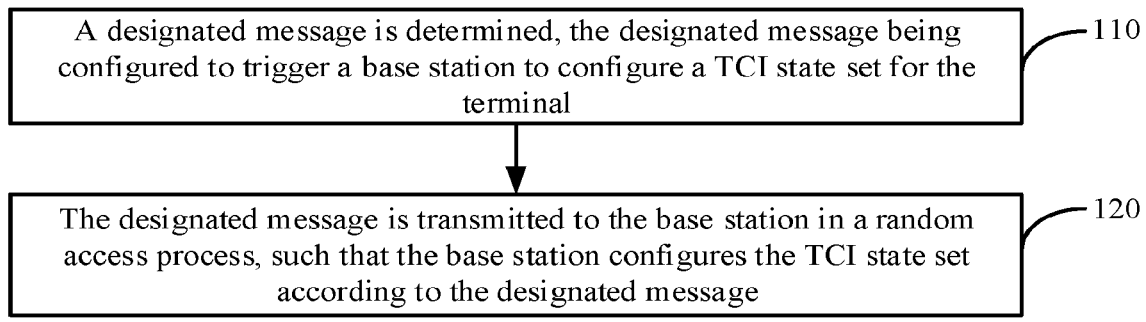
FIG. 1 is a flow chart showing a method of transmission configuration, according to an exemplary embodiment.
Figure 2A:
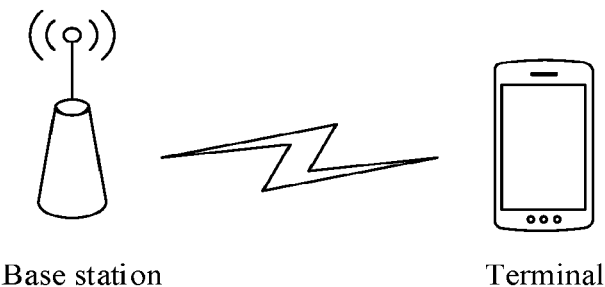
FIG. 2A is a diagram of an application scenario of a method of transmission configuration, according to an exemplary embodiment.

FIG. 1 is a flow chart showing a method of transmission configuration, according to an exemplary embodiment. FIG. 2A is a diagram of an application scenario of a method of transmission configuration, according to an exemplary embodiment. The method of transmission configuration may be applied to a terminal. The terminal may be User Equipment (UE). A base station transmits one or more SSBs to the terminal, and moreover, these SSBs may be transmitted to the terminal by the base station based on different beams. As illustrated in FIG. 1, the method of transmission configuration may include the following operations at blocks 110 to 120.

At block 110, a designated message is determined, the designated message being configured to trigger the base station to configure a TCI state set for the terminal. In the embodiment of the present disclosure, a random process may include a message 1 (Msg.1) configured to initiate random access, a message 2 (Msg.2) configured to represent a random access feedback, a message 3 (Msg.3) configured to represent contention resolution and a message 4 (Msg.4) configured to represent that the contention resolution is successful. The message 1 (Msg.1) and/or the message 3 (Msg.3) may be taken as the designated message configured to trigger the base station to configure the TCI state set for the terminal.

The terminal may determine the specific designated message according to an instruction of the base station or a program written in a chip of the terminal. In an embodiment, the designated message may include respective first messages, i.e., message 1 (Msg.1), corresponding to one or more first SSBs and configured to initiate random access (for example, an Msg.1-i corresponding to an SSB3 #i, an Msg.1-j corresponding to an SSB #j, an Msg.1-k corresponding to an SSB #k and an Msg.1-m corresponding to an SSB #m in FIG. 2B). The first SSB is an SSB detected by the terminal within a designated detection window and capable of triggering random access. A specific implementation process may refer to the embodiment illustrated in FIG. 3.

Figure 2B:
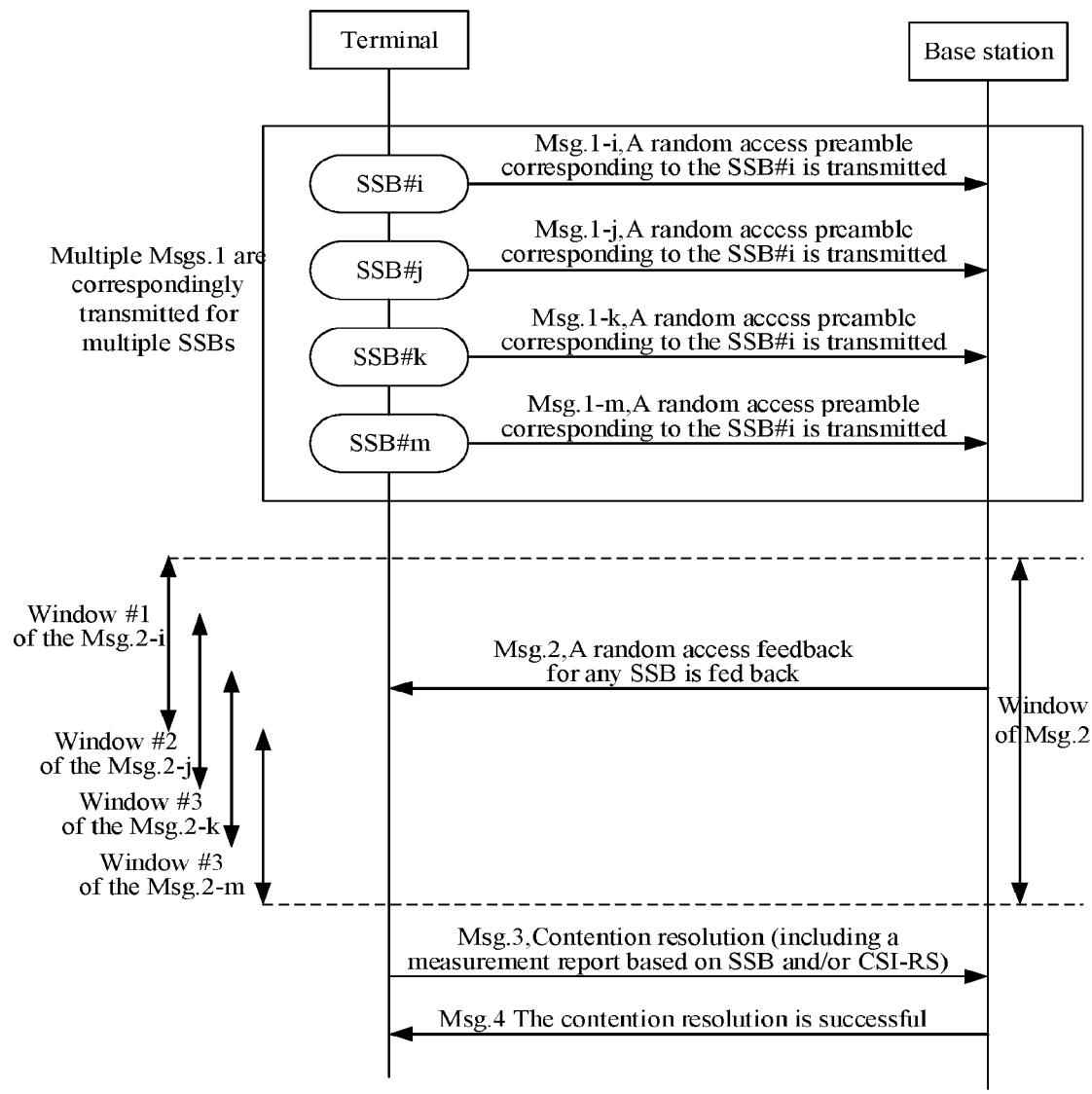
FIG. 2B is a schematic diagram illustrating a designated message, according to an exemplary embodiment.

In an embodiment, the designated message may also include a first set message, i.e., a message 3, carrying a first measurement report and configured to represent contention resolution (for example, an Msg.3 in FIG. 2B). The first measurement report is a measurement report which is obtained after the terminal measures one or more first CSI-RSs corresponding to a second SSB. The second SSB is one of the first SSBs corresponding to respective first messages which are configured for the base station to perform random access feedback. That is, the base station transmits a random access feedback for random access initiated by the second SSB. A specific implementation process may refer to the embodiment illustrated in FIG. 4.

In an embodiment, the designated message may also include a second set message, i.e., a message 3, carrying a second measurement report and configured to represent contention resolution (for example, the Msg.3 in FIG. 2B). The second measurement report is a measurement report which is obtained after the terminal measures one or more second CSI-RSs corresponding to each of one or more third SSBs. The third SSB is selected from respective first SSBs by the terminal, a selection rule may be selecting according to received power of multiple SSBs, and the SSB with higher received power is preferentially selected as the third SSB. A specific implementation process may refer to the embodiment illustrated in FIG. 5.

Figure 2C:
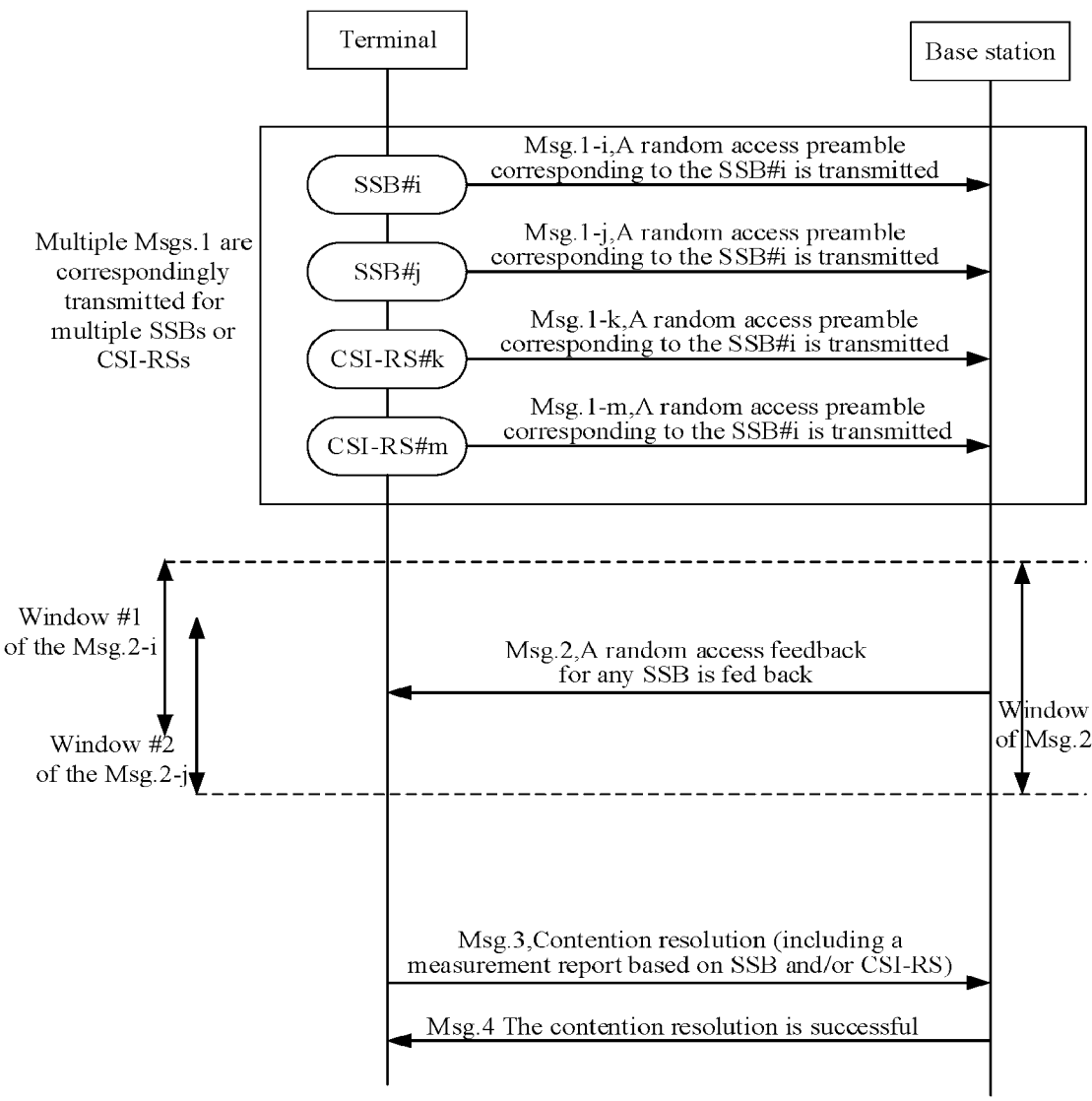
FIG. 2C is another schematic diagram illustrating a designated message, according to an exemplary embodiment.
Figure 2D:
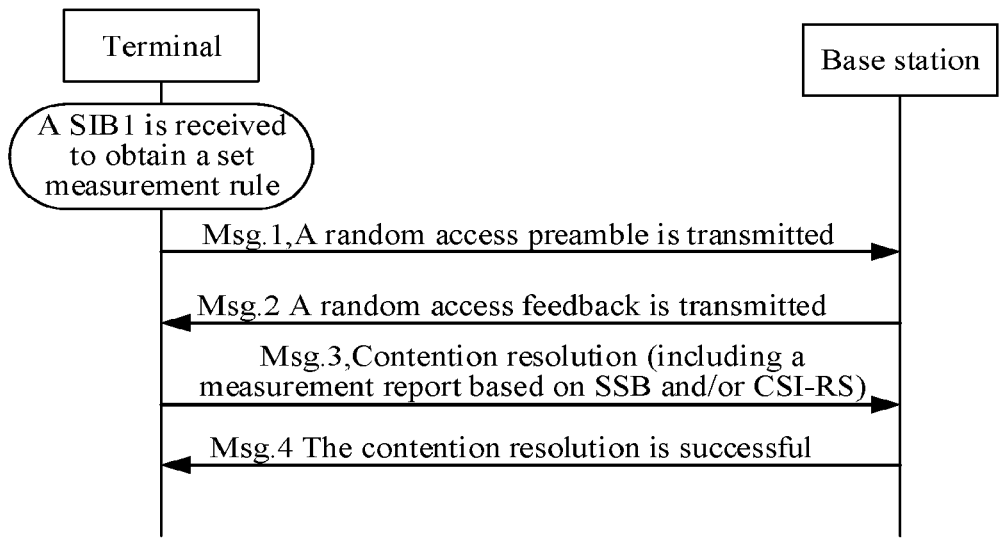
FIG. 2D is a further schematic diagram illustrating a designated message, according to an exemplary embodiment.

In an embodiment, the designated message may include a third set message, i.e., a message 3 (Msg.3), carrying a third measurement report and configured to represent contention resolution (for example, an Msg.3 in FIG. 2D). The third measurement report is a measurement report obtained after the terminal measures one or more fourth SSBs and one or more third CSI-RSs corresponding to a fourth SSB, which are designated by the base station for measurement, according to a set measurement rule. A specific implementation process may refer to the embodiment illustrated in FIG. 6.

In an embodiment, the designated message may also include respective first messages, i.e., message 1 (Msg.1), corresponding to one or more fourth CSI-RSs and configured to initiate random access (for example, an Msg.1-k corresponding to a CSI-RS #k and an Msg.1-m corresponding to a CSI-RS #m in FIG. 2C). The fourth CSI-RS is a CSI-RS detected by the terminal within the designated detection window and capable of triggering random access. A specific implementation process may refer to the embodiment illustrated in FIG. 7.

In an embodiment, the designated message may also include a fourth set message, i.e., a message 3, carrying a fourth measurement report and configured to represent contention resolution (for example, an Msg.3 in FIG. 2C). The fourth measurement report is a measurement report which is obtained after the terminal determines one or more fifth SSBs and one or more sixth CSI-RSs and measures the fifth SSBs and the sixth CSI-RSs according to the set measurement rule. A specific implementation process may refer to the embodiment illustrated in FIG. 8.

At block 120, the designated message is transmitted to the base station in a random access process, such that the base station configures the TCI state set according to the designated message. In the embodiment of the present disclosure, if the designated message includes a first message and/or a third message, the first message and/or the third message are/is transmitted to the base station in the random access process, such that the base station may configure the TCI state set according to the first message and/or the third message.

In an exemplary scenario, as illustrated in FIG. 2A, a base station and a terminal are included. The terminal may determine a designated message configured to trigger the base station to configure a TCI state set for the terminal, and transmit the designated message to the base station in a random access process. The base station, after receiving the designated message transmitted by the terminal in the random access process to trigger the base station to configure the TCI state set for the terminal, may configure the TCI state set according to the designated message.

For example, as illustrated in FIG. 2B, the designated message may include the Msg.1-i corresponding to the SSB #i, the Msg.1-j corresponding to the SSB #j, the Msg.1-k corresponding to the SSB #k and the Msg.1-m corresponding to the SSB #m. The base station, after receiving one or more first messages transmitted by the terminal and configured to initiate random access, may configure the TCI state set for the terminal according to each first message. In addition, the designated message may also include an Msg.3, the Msg.3 includes a measurement report based on SSB and/or CSI-RS. After the terminal transmits the Msg.3 to the base station in the random process, the base station may also configure the TCI state set according to the Msg.3.

For another example, as illustrated in FIG. 2C, the designated message may include the Msg.1-i corresponding to the SSB #i, the Msg.1-j corresponding to the SSB #j, the Msg.1-k corresponding to the CSI-RS #k and the Msg.1-m corresponding to the CSI-RS #m. The base station, after receiving one or more first messages transmitted by the terminal and configured to initiate random access, may also configure the TCI state set for the terminal according to each first message. In addition, the designated message may also include an Msg.3, the Msg.3 includes a measurement report based on SSB and/or CSI-RS. After the terminal transmits the Msg.3 to the base station in the random process, the base station may also configure the TCI state set according to the Msg.3.

For example, as illustrated in FIG. 2D, the designated message may include an Msg.3 only, the Msg.3 includes a measurement report based on SSB and/or CSI-RS. After the terminal transmits the Msg.3 to the base station in the random process, the base station may also configure the TCI state set according to the Msg.3. It can be seen from the embodiment that the designated message configured to trigger the base station to configure the TCI state set for the terminal is determined, and the designated message is transmitted to the base station in the random access process, such that the base station configures the TCI state set according to the designated message. Therefore, the transmission configuration efficiency is improved, and a delay is reduced.

Figure 3:
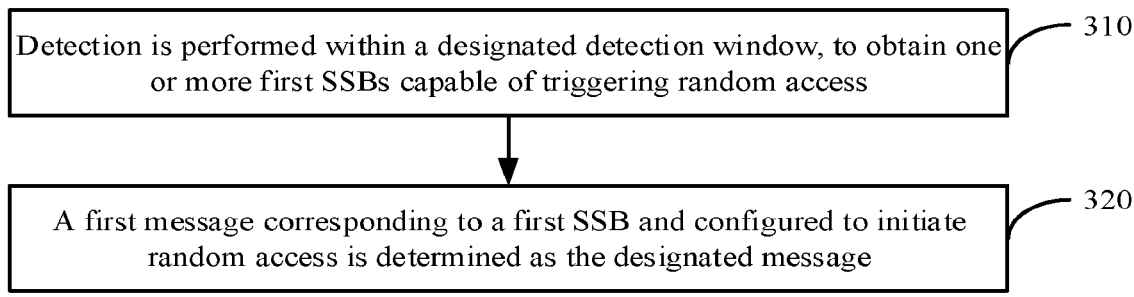
FIG. 3 is a flow chart showing another method of transmission configuration, according to an exemplary embodiment.

FIG. 3 is a flow chart showing another method of transmission configuration, according to an exemplary embodiment. The method of transmission configuration may be applied to a terminal and is based on the method illustrated in FIG. 1. When the operation at block 110 is executed, as illustrated in FIG. 3, the following operations at blocks 310 to 320 may be included.

At block 310, detection is performed within a designated detection window, to obtain one or more first SSBs capable of triggering random access. In the embodiment of the present disclosure, the first SSB may refer to an SSB capable of triggering random access. For example, received power of the first SSB is greater than a first designated power threshold. That is, for the terminal, signal strength of the first SSB is higher, so that better network service may be provided for the terminal.

The terminal, after detecting SSBs transmitted by the base station and based on different beams, may determine specific SSBs capable of triggering random access and specific SSBs incapable of triggering random access according to a practical condition. For how to determine the specific SSBs capable of triggering random access, many determination manners may be adopted, including, but not limited to, the following two determination manners.

A first manner: all SSBs meeting a designated received power condition are determined as first SSBs capable of triggering random access. That is, the received power of the first SSB only needs to meet the designated received power condition. In this manner, a specific implementation mode includes that (1-1) when any SSB meeting the designated received power condition is detected within the designated detection window, the SSB is determined as a first SSB, an SSB detected at the earliest time within the designated detection window and meeting the designated received power condition being determined as an earliest SSB.

In a second manner, the earliest SSB meeting the designated received power condition is determined as a first SSB capable of triggering random access, while another SSB meeting the designated received power condition may be determined as a first SSB capable of triggering random access only if received power thereof is greater than a difference value between received power of the earliest SSB and a designated offset value. That is, the received power of the earliest first SSB only needs to meet the designated received power condition, while the received power of another first SSB not only needs to meet the designated received power condition but also needs to be not much lower than the received power of the earliest first SSB.

In this manner, a specific implementation mode includes that:
(2-1) when the earliest SSB meeting the designated received power condition is detected within the designated detection window, the earliest SSB may be determined as a first SSB;
(2-2) when any other SSB meeting the designated received power condition is detected within the designated detection window, a difference value between the received power of the earliest SSB and the designated offset value is calculated; and
(2-3) when received power of the other SSB is greater than the difference value between the received power of the earliest SSB and the designated offset value, the other SSB is determined as a first SSB.

In an embodiment, the designated received power condition in the first manner and the second manner may be that received power of the terminal on an SSB is greater than the first designated power threshold. That is, only when received power of a detected SSB is greater than the first designated power threshold, the SSB may be determined as a first SSB capable of triggering random access. In addition, the first designated power threshold and the designated offset value may be notified to the terminal by the base station through a system message.

In an embodiment, when the operation at block 310 is executed, the method of transmission configuration may further include that, when it is detected that a first designated stopping condition is met, SSB detection is stopped. The first designated stopping condition may include at least one of:
(3-1) all SSBs designated by the base station and need to be detected are detected;
(3-2) a designated number of first SSBs are detected; or
(3-3) there is a need to start monitoring a random access feedback corresponding to random access which is initiated by the earliest SSB.

All the SSBs designated by the base station and need to be detected in (3-1) may be all SSBs transmitted by the base station. For example, all the SSBs transmitted by the base station are detected at least once (since these SSBs are periodically transmitted, detection for a period may certainly ensure that all the SSBs transmitted by the base station are detected at least once).

The designated number in (3-2) may be specified in a communication protocol, or may be notified to the terminal by the base station through the system message. For example, the designated number is 64.

In addition, if the condition in (3-3) is met, no matter whether all the SSBs designated by the base station and need to be detected in (3-1) are detected and whether the designated number of first SSBs in (3-2) are detected, it needs to stop SSB detection and start monitoring the random access feedback corresponding to random access which is initiated by the earliest SSB.

At block 320, a first message corresponding to the first SSB and configured to initiate random access is determined as the designated message. It can be seen from the embodiment that, when one or more first SSBs capable of triggering random access are detected within the designated detection window, the first message corresponding to the first SSB and configured to initiate random access may be determined as the designated message. The first message corresponding to the first SSB and configured to initiate random access is transmitted to the base station in the random access process, such that the base station may configure the TCI state set according to the first message corresponding to the first SSB and configured to initiate random access. Therefore, the transmission configuration efficiency is improved, and the delay is reduced.

Figure 4:
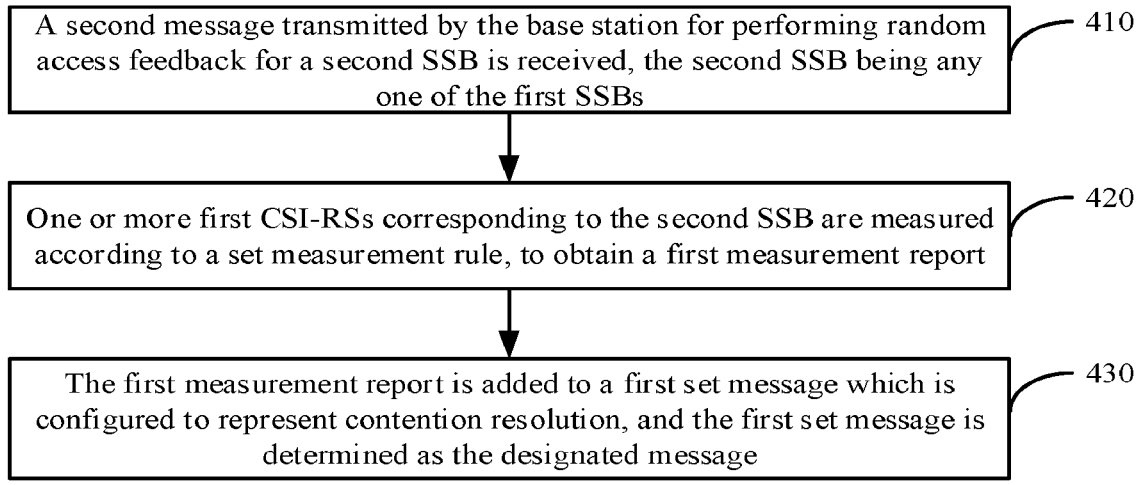
FIG. 4 is a flow chart showing another method of transmission configuration, according to an exemplary embodiment.

FIG. 4 is a flow chart showing another method of transmission configuration, according to an exemplary embodiment. The method of transmission configuration may be applied to a terminal and is based on the method illustrated in FIG. 3. When the operation at block 110 is executed, as illustrated in FIG. 4, the following operations at blocks 410 to 430 may further be included.

At block 410, a second message transmitted by the base station for performing random access feedback for a second SSB is received, the second SSB being any one of the first SSBs. In the embodiment of the present disclosure, no matter how many first messages the terminal transmits to the base station, the base station returns only one second message, and may return the one second message for any one of multiple first SSBs. The base station may determine the specific first SSB that the second message is returned for according to a certain rule. For example, received power of respective first messages are compared, and the first SSB corresponding to the first message with highest received power is selected as the second SSB; or the first SSB corresponding to the first message that is received earliest is selected as the second SSB.

There is a temporary Cell Radio Network Temporary Identifier (C-RNTI) in the second message, the temporary C-RNTI is a dynamic identifier allocated to the terminal by the base station. The base station may configure a Physical Uplink Shared Channel (PUSCH) resource for transmitting the third message (Msg.3) for the terminal. In an embodiment, when the operation at block 410 is executed, the second message may be received within a designated time bucket. The designated time bucket includes a time bucket corresponding to the first message corresponding to each first SSB and configured for reception of a random access feedback.

Specifically, the designated time bucket starts from starting time of the time bucket corresponding to the first message corresponding to the earliest first SSB and configured for random access feedback, and the designated time bucket ends at ending time of the time bucket corresponding to the first message corresponding to a last first SSB and configured for random access feedback. If the second message is received within the designated time bucket, the third message may be transmitted before the designated time bucket ends rather than transmitted after the designated time bucket ends.

As illustrated in FIG. 2B, the terminal, after transmitting the Msg.1-i corresponding to the SSB #i, the Msg.1-j corresponding to the SSB #j, the Msg.1-k corresponding to the SSB #k and the Msg.1-m corresponding to the SSB #m to the base station (that is, the terminal transmits four first messages to the base station), may receive an Msg.2 returned by the base station in a window #1 of an Msg.2-i, a window #2 of an Msg.2-j, a window #3 of an Msg.3-k and a window #4 of an Msg.2-m (that is, the terminal, if not receiving the Msg.2 in the window #1 of the Msg.2-i, further needs to receive the Msg.2 in a time bucket corresponding to the window #2 of the Msg.2-j and configured to receive the random access feedback, if still not receiving the Msg.2, further receives the Msg.2 in a time bucket corresponding to the window #3 of the Msg.2-k and configured to receive the random access feedback, and so on).

At block 420, one or more first CSI-RSs corresponding to the second SSB are measured according to a set measurement rule, to obtain a first measurement report.

At block 430, the first measurement report is added to a first set message configured to represent contention resolution, and the first set message is determined as the designated message. It can be seen from the embodiment that, in the random access process, the first set message carrying the first measurement report may also be transmitted to the base station, such that the base station may configure the TCI state set according to the first message, which corresponds to each first SSB and is configured to initiate random access, and the first measurement report. Therefore, the transmission configuration efficiency is further improved, and the delay is reduced.

Figure 5:
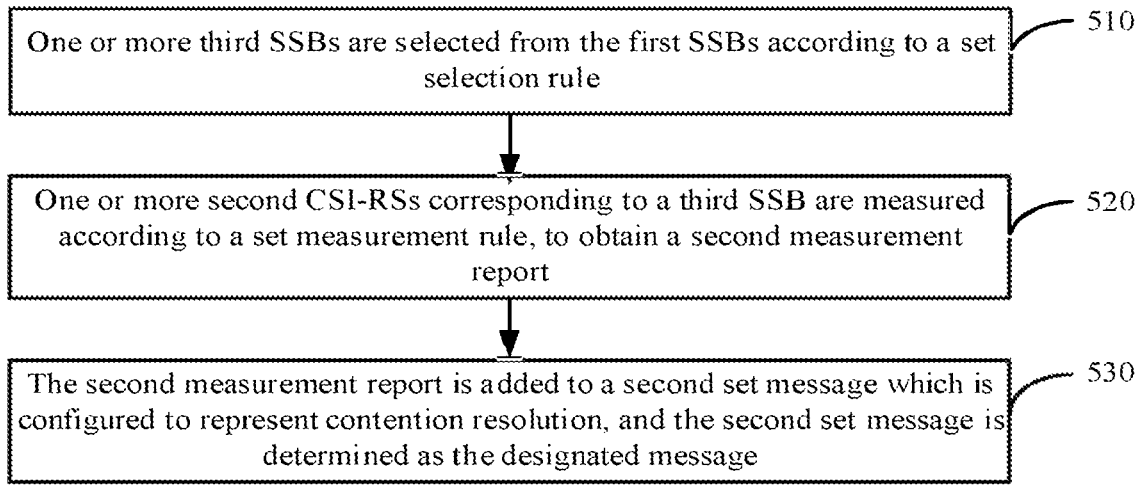
FIG. 5 is a flow chart showing another method of transmission configuration, according to an exemplary embodiment.

FIG. 5 is a flow chart showing another method of transmission configuration, according to an exemplary embodiment. The method of transmission configuration may be applied to a terminal and is based on the method illustrated in FIG. 3 or FIG. 4. When the operation at block 110 is executed, as illustrated in FIG. 5, the following operations at blocks 510 to 530 may further be included.

At block 510, one or more third SSBs are selected from the first SSBs according to a set selection rule. In an embodiment, the set selection rule may be sequentially selecting according to a descending order of received power of SSBs.

At block 520, one or more second CSI-RSs corresponding to the third SSB are measured according to the set measurement rule, to obtain a second measurement report.

At block 530, the second measurement report is added to a second set message which is configured to represent contention resolution, and the second set message is also determined as the designated message. It can be seen from the embodiment that, in the random access process, the second set message carrying the second measurement report may also be transmitted to the base station, such that the base station may configure the TCI state set according to the first message, which corresponds to the first SSB and is configured to initiate random access, and the second measurement report. Therefore, the transmission configuration efficiency is further improved, and the delay is reduced.

Figure 6:
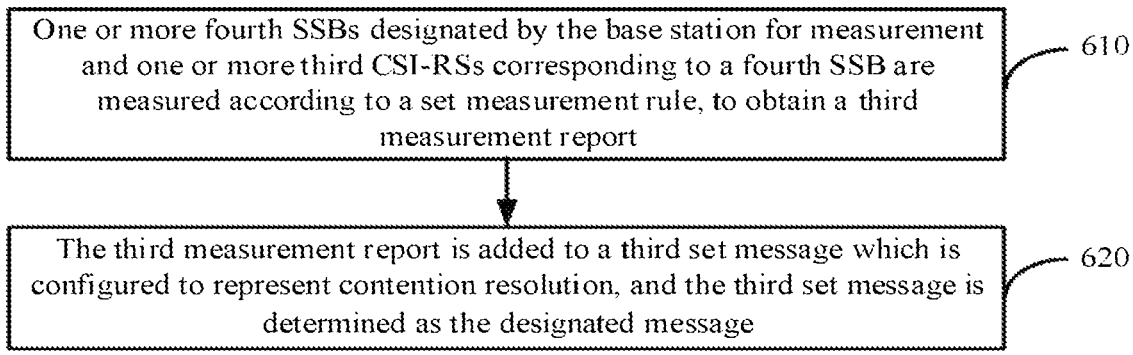
FIG. 6 is a flow chart showing another method of transmission configuration, according to an exemplary embodiment.

FIG. 6 is a flow chart showing another method of transmission configuration, according to an exemplary embodiment. The method of transmission configuration may be applied to a terminal and is based on the method illustrated in FIG. 1. When the operation at block 110 is executed, as illustrated in FIG. 6, the following operations at blocks 610 to 620 may be included.

At block 610, one or more fourth SSBs designated by the base station for measurement and one or more third CSI-RSs corresponding to the fourth SSB are measured according to the set measurement rule, to obtain a third measurement report.

At block 620, the third measurement report is added to a third set message which is configured to represent contention resolution, and the third set message is determined as the designated message.

It can be seen from the embodiment that, the one or more fourth SSBs designated by the base station for measurement and the one or more third CSI-RSs corresponding to the fourth SSB may be measured according to the set measurement rule to obtain the third measurement report at first. Then the third measurement report is added to the third set message configured to represent contention resolution, and the third set message is determined as the designated message. The third set message carrying the third measurement report is transmitted to the base station in the random access process, such that the base station may configure the TCI state set according to the third measurement report. Therefore, the transmission configuration efficiency is improved, and the delay is reduced.

Figure 7:
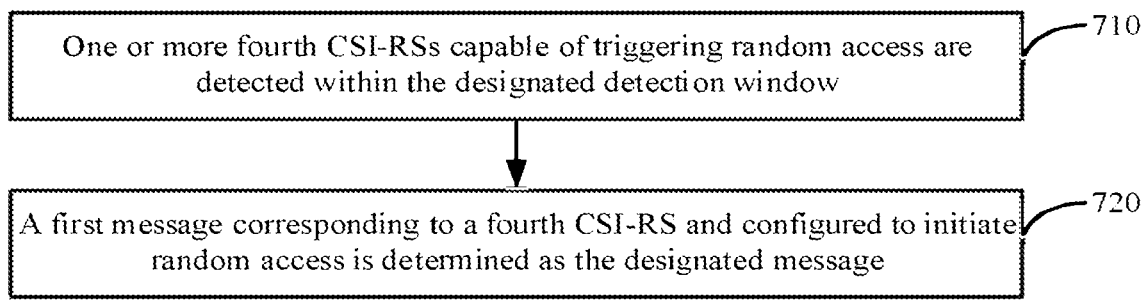
FIG. 7 is a flow chart showing another method of transmission configuration, according to an exemplary embodiment.

FIG. 7 is a flow chart showing another method of transmission configuration, according to an exemplary embodiment. The method of transmission configuration may be applied to a terminal and is based on the method illustrated in FIG. 3. When the operation at block 110 is executed, as illustrated in FIG. 7, the following operations at blocks 710 to 720 may further be included.

At block 710, one or more fourth CSI-RSs capable of triggering random access are detected within the designated detection window. In the embodiment of the present disclosure, the fourth CSI-RS may refer to a CSI-RS capable of triggering random access. For example, received power of the fourth CSI-RS is greater than a second designated power threshold. That is, for the terminal, signal strength of the fourth CSI-RS is higher, so that better network service may be provided for the terminal.

The terminal, after detecting CSI-RSs transmitted by the base station and based on different beams, may determine specific CSI-RSs capable of triggering random access and specific CSI-RSs incapable of triggering random access according to the practical condition. For how to determine the specific CSI-RSs capable of triggering random access, many determination manners may be adopted, including, but not limited to, the following determination manner:

(4-1) an earliest SSB meeting a first designated received power condition is detected within the designated detection window;

(4-2) when any fifth CSI-RS meeting a second designated received power condition is detected within the designated detection window, a first difference value between received power of the earliest SSB and the designated offset value is calculated;

(4-3) received power of the fifth CSI-RS is regulated according to a designated transmitted power difference value between an SSB and a CSI-RS, to obtain regulated received power; and (4-4) when the regulated received power is greater than the first difference value, the fifth CSI-RS is determined as a fourth CSI-RS.

In an embodiment, the second designated received power condition may be different from the first designated received power condition. For example, the second designated received power condition may be that received power of the terminal on a CSI-RS is greater than the second designated power threshold. That is, only when received power of a detected SSB is greater than the second designated power threshold, the CSI-RS may be determined as a fourth CSI-RS capable of triggering random access.

In addition, the difference value between transmitted power of the SSB and the CSI-RS, the second designated power threshold and the designated offset value may be notified to the terminal by the base station through the system message.

In an embodiment, when the operation at block 710 is executed, the method of transmission configuration may further include that, when it is detected that a second designated stopping condition is met, SSB detection and CSI-RS detection are stopped. The second designated stopping condition may include at least one of:

(5-1) all SSBs and CSI-RSs designated by the base station and need to be detected are detected;

(5-2) a designated number of first SSBs and fourth CSI-RSs are detected; or (5-3) there is a need to start monitoring a random access feedback corresponding to random access which is initiated by the earliest SSB.

All the SSBs designated by the base station and need to be detected in (5-1) may be all SSBs transmitted by the base station. For example, all the SSBs transmitted by the base station are detected at least once (since these SSBs are periodically transmitted, detection for a period may certainly ensure that all the SSBs transmitted by the base station are detected at least once). Similarly, all the CSI-RSs need to be detected (5-1) may be all CSI-RSs transmitted by the base station. For example, all the CSI-RSs transmitted by the base station are detected at least once (since these CSI-RSs are periodically transmitted, detection for a period may certainly ensure that all the CSI-RSs transmitted by the base station are detected at least once).

The designated number in (5-2) may be designated in the communication protocol and may also be notified to the terminal by the base station through the system message. For example, the designated number is 64.

In addition, if the condition in (5-3) is met, no matter whether all the SSBs and CSI-RSs designated by the base station and need to be detected in (5-1) are detected and whether the designated number of first SSBs and fourth CSI-RSs in (5-2) are detected, it needs to stop SSB detection and CSI-RS detection and start monitoring the random access feedback corresponding to random access which is initiated by the earliest SSB.

At block 720, a first message corresponding to the fourth CSI-RS and configured to initiate random access is determined as the designated message.

It can be seen from the embodiment that, fourth CSI-RSs capable of triggering random access may be detected at the same time of detecting the first SSBs capable of triggering random access within the designated detection window. When one or more fourth CSI-RSs capable of triggering random access are detected, the first message corresponding to each fourth CSI-RS and configured to initiate random access may also be determined as the designated message, and the first message corresponding to each fourth CSI-RS and configured to initiate random access is also transmitted to the base station in the random process, such that the base station may configure the TCI state set according to the first message corresponding to each first SSB and the first message corresponding to each fourth CSI-RS. Therefore, the transmission configuration efficiency is improved, and the delay is reduced.

Figure 8:
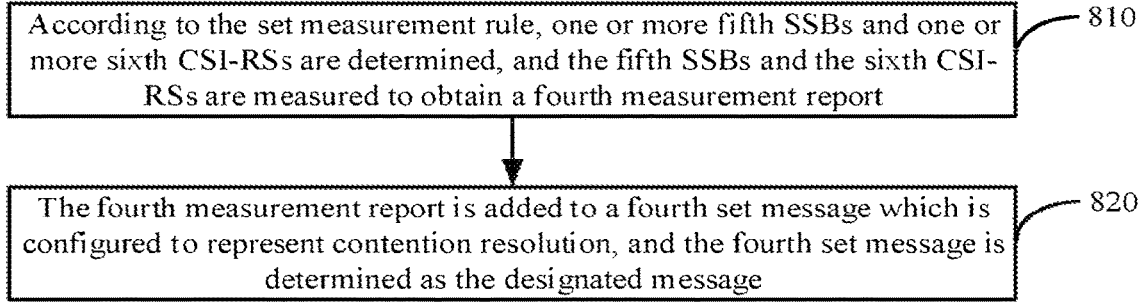
FIG. 8 is a flow chart showing another method of transmission configuration, according to an exemplary embodiment.

FIG. 8 is a flow chart showing another method of transmission configuration, according to an exemplary embodiment. The method of transmission configuration may be applied to a terminal and is based on the method illustrated in FIG. 7. When the operation at block 110 is executed, as illustrated in FIG. 8, the following operations at blocks 810 to 820 may further be included.

At block 810, according to the set measurement rule, one or more fifth SSBs and one or more sixth CSI-RSs are determined, and the fifth SSBs and the sixth CSI-RSs are measured to obtain a fourth measurement report. In the embodiment of the present disclosure, the fifth SSB may be designated by the base station for measurement and is different from the first SSB, and the sixth CSI-RS may be designated by the base station for measurement and is different from the fourth CSI-RS.

At block 820, the fourth measurement report is added to a fourth set message which is configured to represent contention resolution, and the fourth message is determined as the designated message. It can be seen from the embodiment that the fourth set message carrying the fourth measurement report may also be transmitted to the base station, such that the base station may configure the TCI state set according to the first message corresponding to each first SSB, the first message corresponding to each fourth CSI-RS and the fourth measurement report. Therefore, the transmission configuration efficiency is further improved, and the delay is reduced.

In an embodiment, in the embodiment illustrated in FIG. 4 or FIG. 5 or FIG. 6 or FIG. 8, the set measurement rule may be notified by the base station through the system message, and the system message may be a System Information Block (SIB) 1. A specific implementation process includes that a system message transmitted by the base station is received, the system message including the set measurement rule. The set measurement rule includes:

(6-1) a measurement object, the measurement object including one or more SSBs designated by the base station for measurement and/or one or more CSI-RSs corresponding to each SSB designated for measurement;

(6-2) a measurement triggering condition, the measurement triggering condition including a designated measurement triggering threshold value; and (6-3) a configuration of a measurement report, the configuration of the measurement report including a designated content of the measurement report, or the configuration of the measurement report including the designated content of the measurement report and a designated transmission resource of the measurement report.

In (6-1), since an SSB corresponds to a wide beam, multiple CSI-RSs corresponding to the SSB may correspond to multiple narrow beams of the wide beam. Table 1 shows a corresponding relationship between an SSB and a CSI-RS.

TABLE 1

| SSB identifier | Case 1: CSI-RS identifier | Case 3: CSI-RS identifier |
|---|---|---|
| SSB#0 | CSI-RS#0<br>CSI-RS#1<br>CSI-RS#2 | CSI-RS#0<br>CSI-RS#1<br>CSI-RS#2 |
| SSB#1 | CSI-RS#2<br>CSI-RS#3<br>CSI-RS#4 | CSI-RS#3<br>CSI-RS#5<br>CSI-RS#6 |
| SSB#3 | CSI-RS#7<br>CSI-RS#8<br>CSI-RS#9 | CSI-RS#7<br>CSI-RS#9<br>CSI-RS#10 |
| | Notes:<br>both the SSB#0 and the SSB#1 correspond to the CSI-RS#2 | Notes:<br>the CSI-RS identifiers may be discontinuous, but the CSI-RS identifier corresponding to the SSB#3 may not be smaller than the CSI-RS identifier corresponding to the previous SSB#0 or SSB#1 |

In (6-2), the designated measurement triggering threshold value may be a designated SSB received power threshold and a power threshold of Layer 1-Reference Signal Received Power (L1-RSRP), or the designated measurement triggering threshold value may be a designated SSB received quality threshold and a quality threshold of Layer 1-Reference Signal Received Quality (L1-RSRQ). Similarly, the designated measurement triggering threshold value may be a designated CSI-RS received power threshold and a power threshold of L1-RSRP, or the designated measurement triggering threshold value may be a designated CSI-RS received quality threshold and a quality threshold of L1-RSRQ.

In (6-3), the designated content of the measurement report may be an SSB identifier and at least one of L1-RSRP or L1-RSRQ. The designated transmission resource may be a Physical Uplink Control Channel (PUCCH) or PUSCH resource. Similarly, the designated content of the measurement report may be a CSI-RS identifier and at least one of L1-RSRP or L1-RSRQ. The designated transmission resource may be a PUCCH or PUSCH resource.

In addition, in (6-3), the base station may configure the designated transmission resource for the measurement report, or may not configure the designated transmission resource. If the designated transmission resource is not configured, a resource configured for the terminal by the base station to transmit the Msg.3 may be directly reused. The resource configured to transmit the Msg.3 may be a PUCCH or PUSCH resource.

Figure 9:
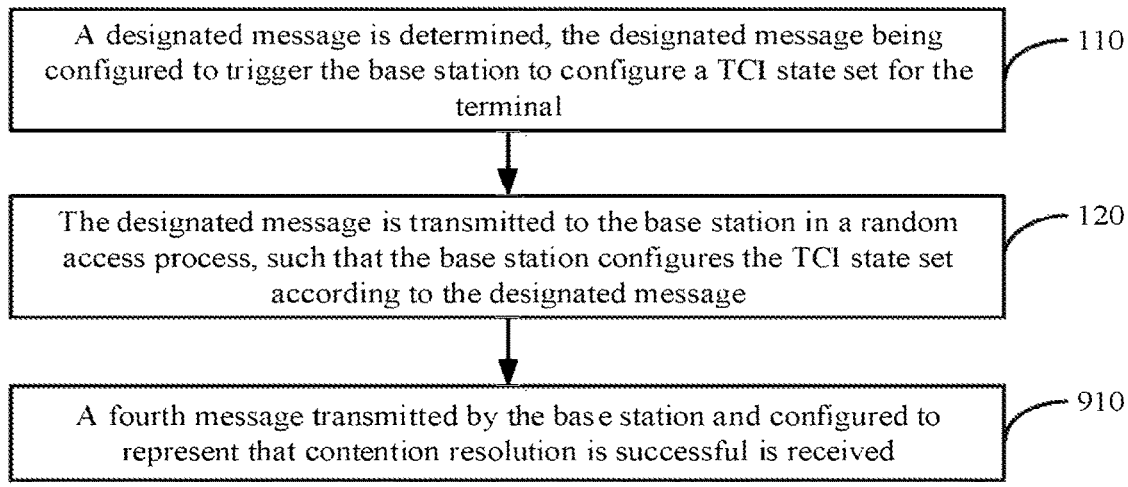
FIG. 9 is a flow chart showing another method of transmission configuration, according to an exemplary embodiment.

FIG. 9 is a flow chart showing another method of transmission configuration, according to an exemplary embodiment. The method of transmission configuration may be applied to a terminal and is based on the method illustrated in FIG. 1. As illustrated in FIG. 9, the method of transmission configuration may further include the following operation at block 910.

At block 910, a fourth message, which is transmitted by the base station and configured to represent that contention resolution is successful, is received. In the embodiment of the present disclosure, the terminal receives the fourth message configured to represent that the contention resolution is successful, and may determine that random access succeeds according to a contention resolution identifier carried in the fourth message.

Figure 10:
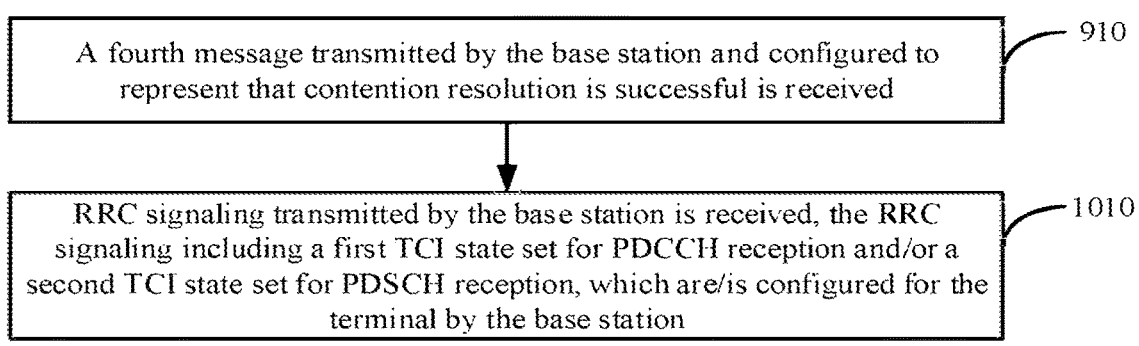
FIG. 10 is a flow chart showing another method of transmission configuration, according to an exemplary embodiment.

In an embodiment, when or after Step 910 is executed, as illustrated in FIG. 10, the method of transmission configuration may further include the following operation at block 1010.

At block 1010, RRC signaling transmitted by the base station is received, the RRC signaling including a first TCI state set for PDCCH reception and/or a second TCI state set for PDSCH reception, which are/is configured for the terminal by the base station, wherein the first TCI state set includes a first corresponding relationship between a TCI state identifier for PDCCH reception and at least one of an SSB identifier or a CSI-RS identifier, and the second TCI state set includes a second corresponding relationship between a TCI state identifier for PDSCH reception and at least one of an SSB identifier or a CSI-RS identifier.

In the embodiment of the present disclosure, the first corresponding relationship may refer to a corresponding relationship between the TCI state identifier for PDCCH reception and at least one of the SSB identifier or the CSI-RS identifier. In addition, a Quasi-Co-Location (QCL) type corresponding to the TCI state identifier for PDCCH reception is a type D, and the type D is configured for a spatial Reception (Rx) parameter, i.e., a beam indication.

The second corresponding relationship may refer to a corresponding relationship between the TCI state identifier for PDSCH reception and at least one of the SSB identifier or the CSI-RS identifier. In addition, a QCL type corresponding to the TCI state identifier for PDSCH reception is the type D, and the type D is configured for the spatial Rx parameter, i.e., the beam indication.

The base station may transmit the RRC signaling carrying the first TCI state set and/or the second TCI state set at the same time of transmitting the fourth message, or the base station may transmit the RRC signaling carrying the first TCI state set and/or the second TCI state set after transmitting the fourth message. Therefore, the terminal may receive the RRC signaling carrying the first TCI state set and/or the second TCI state set at the same time of receiving the fourth message, or may receive the RRC signaling carrying the first TCI state set and/or the second TCI state set after receiving the fourth message.

In addition, the first TCI state set or second TCI state set configured for the terminal by the base station may include only one TCI state identifier or may include multiple TCI state identifiers. If only one TCI state identifier is included, the terminal, when receiving a PDCCH or a PDSCH, may directly adopt a receiving beam which is same as that receiving an SSB designated by an SSB identifier corresponding to the TCI state identifier and/or a CSI-RS designated by a CSI-RS identifier corresponding to the TCI state identifier. If multiple TCI state identifiers are included, the terminal, when receiving a PDCCH or a PDSCH, also needs to receive a TCI state identifier which is reactivated or re-indicated by the base station (referring to the embodiments illustrated in FIG. 10 and FIG. 11).

It can be seen from the embodiment that, when or after the fourth message, which is transmitted by the base station and configured to represent that the contention resolution is successful, is received, the RRC signaling transmitted by the base station is received. The RRC signaling includes the first TCI state set for PDCCH reception and/or the second TCI state set for PDSCH reception, which are/is configured for the terminal by the base station, so that the reliability of receiving the TCI state set is improved, and the delay is also avoided.

Figure 11:
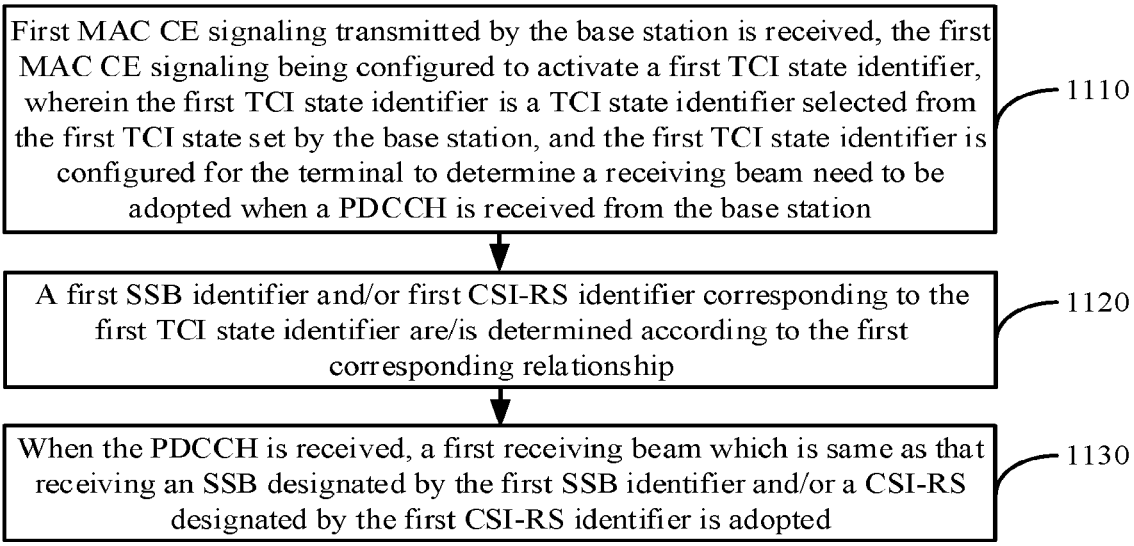
FIG. 11 is a flow chart showing another method of transmission configuration, according to an exemplary embodiment.

FIG. 11 is a flow chart showing another method of transmission configuration, according to an exemplary embodiment. The method of transmission configuration may be applied to a terminal and is based on the method illustrated in FIG. 10. The first TCI state set includes at least two TCI state identifiers. As illustrated in FIG. 11, the method of transmission configuration may further include the following operations at blocks 1110 to 1130.

At block 1110, first MAC CE signaling transmitted by the base station is received, the first MAC CE signaling being configured to activate a first TCI state identifier, wherein the first TCI state identifier is a TCI state identifier selected from the first TCI state set by the base station, and the first TCI state identifier is configured for the terminal to determine a receiving beam needs to be adopted when a PDCCH is received from the base station.

In the embodiment of the present disclosure, the first MAC CE signaling is configured to activate the first TCI state identifier. For example, the first TCI state set includes 64 TCI state identifiers, and the base station may select one of the 64 TCI state identifiers as the first TCI state identifier.

At block 1120, a first SSB identifier and/or first CSI-RS identifier corresponding to the first TCI state identifier are/is determined according to the first corresponding relationship. The first corresponding relationship is in the first TCI state set.

At block 1130, when the PDCCH is received, a first receiving beam, which is same as that receiving an SSB designated by the first SSB identifier and/or a CSI-RS designated by the first CSI-RS identifier, is adopted.

It can be seen from the embodiment that the first MAC CE signaling transmitted by the base station is received, the first MAC CE signaling being configured to activate the first TCI state identifier and the first TCI state identifier being selected from the first TCI state set by the base station. The first SSB identifier and/or first CSI-RS identifier corresponding to the first TCI state identifier are/is determined according to the first corresponding relationship. When the PDCCH is received, a first receiving beam, which is same as that receiving the SSB designated by the first SSB identifier and/or the CSI-RS designated by the first CSI-RS identifier, is adopted, so that a transmission configuration for PDCCH reception is implemented, and the reliability of the transmission configuration is also improved.

Figure 12:
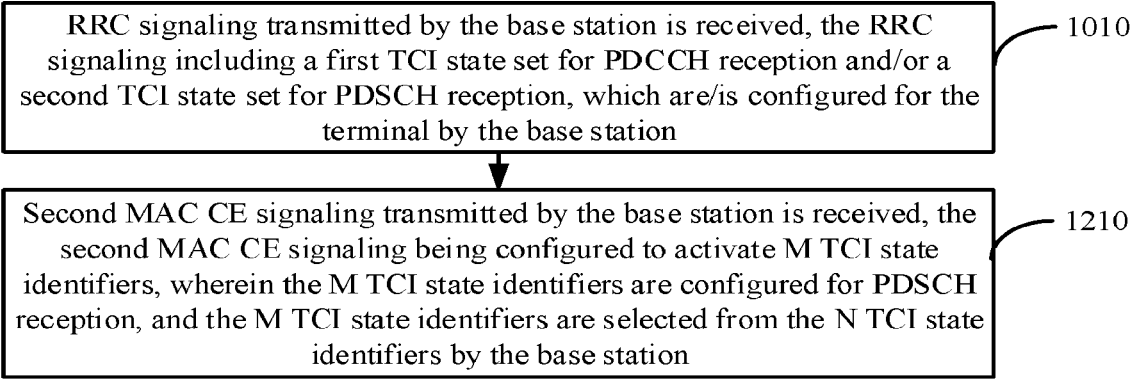
FIG. 12 is a flow chart showing another method of transmission configuration, according to an exemplary embodiment.

FIG. 12 is a flow chart showing another method of transmission configuration, according to an exemplary embodiment. The method of transmission configuration may be applied to a terminal and is based on the method illustrated in FIG. 10. The second TCI state set includes N TCI state identifiers, N being greater than 1. As illustrated in FIG. 12, the method of transmission configuration may further include the following operation at block 1210.

At block 1210, second MAC CE signaling transmitted by the base station is received, the second MAC CE signaling being configured to activate M TCI state identifiers, wherein the M TCI state identifiers are configured for PDSCH reception, and the M TCI state identifiers are selected from the N TCI state identifiers by the base station. In the embodiment of the present disclosure, M is smaller than N. For example, N is 64, and M is 8. For a PDSCH, the base station may select eight TCI state identifiers from the 64 TCI state identifiers, and notify them to the terminal through the second MAC CE signaling.

It can be seen from the embodiment that the second MAC CE signaling transmitted by the base station is received, the second MAC CE signaling being configured to activate the M TCI state identifiers. The M TCI state identifiers are configured for PDSCH reception, and the M TCI state identifiers are selected from the N TCI state identifiers. Therefore, a transmission configuration for PDSCH reception is implemented, and the reliability of the transmission configuration is also improved.

Figure 13:
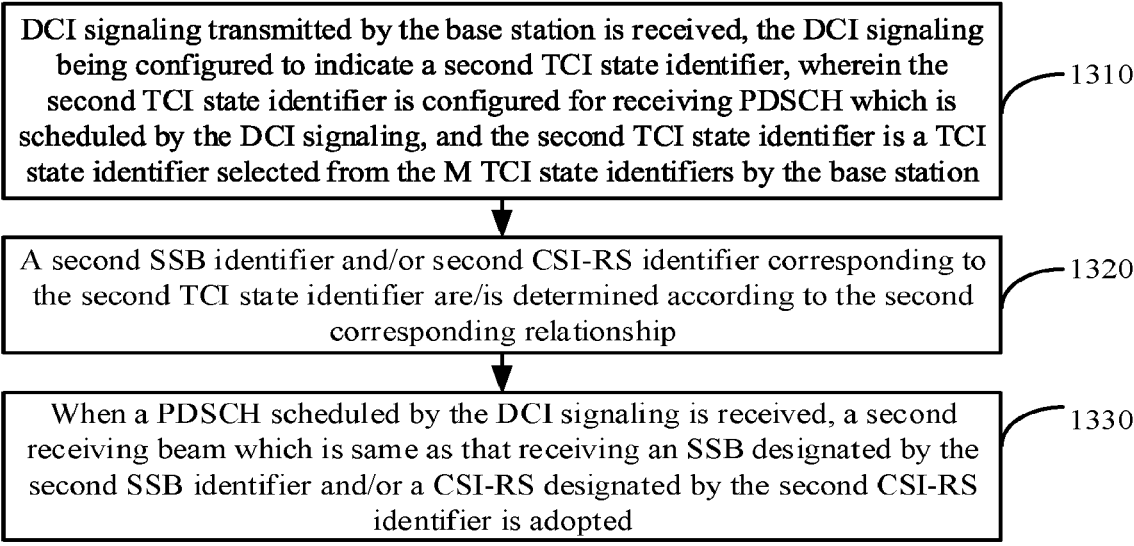
FIG. 13 is a flow chart showing another method of transmission configuration, according to an exemplary embodiment.

FIG. 13 is a flow chart showing another method of transmission configuration, according to an exemplary embodiment. The method of transmission configuration may be applied to a terminal and is based on the method illustrated in FIG. 12. M is greater than 1. As illustrated in FIG. 13, the method of transmission configuration may further include the following operations at blocks 1310 to 1330.

At block 1310, DCI signaling transmitted by the base station is received, the DCI signaling being configured to indicate a second TCI state identifier, wherein the second TCI state identifier is configured for receiving PDSCH which is scheduled by the DCI signaling, and the second TCI state identifier is a TCI state identifier selected from the M TCI state identifiers by the base station. In the embodiment of the present disclosure, M is greater than 1. For example, M is 8. The base station may select one of the 8 TCI state identifiers as the second TCI state identifier.

At block 1320, a second SSB identifier and/or second CSI-RS identifier corresponding to the second TCI state identifier are/is determined according to the second corresponding relationship. The second corresponding relationship is in the second TCI state set.

At block 1330, when a PDSCH scheduled by the DCI signaling is received, a second receiving beam, which is same as that receiving an SSB designated by the second SSB identifier and/or a CSI-RS designated by the second CSI-RS identifier, is adopted.

It can be seen from the embodiment that the DCI signaling transmitted by the base station is received, the DCI signaling indicating the second TCI state identifier configured for receiving PDSCH which is scheduled by the DCI signaling, and the second TCI state identifier being a TCI state identifier selected from the M TCI state identifiers by the base station. The second SSB identifier and/or second CSI-RS identifier corresponding to the second TCI state identifier are/is determined according to the second corresponding relationship. When the PDSCH scheduled by the DCI signaling is received, a second receiving beam, which is same as that receiving the SSB designated by the second SSB identifier and/or the CSI-RS designated by the second CSI-RS identifier, is adopted, so that a transmission configuration for PDSCH reception scheduled by the DCI signaling is implemented, and the reliability of the transmission configuration is also improved.

Figure 14:
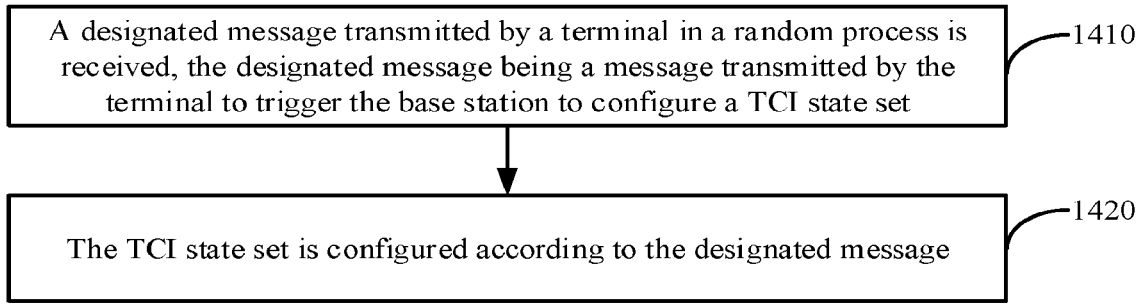
FIG. 14 is a flow chart showing a method of transmission configuration, according to an exemplary embodiment.

FIG. 14 is a flow chart showing a method of transmission configuration, according to an exemplary embodiment. The method of transmission configuration may be applied to a base station. As illustrated in FIG. 14, the method of transmission configuration may include the following operations at blocks 1410 to 1420.

At block 1410, a designated message transmitted by a terminal in a random process is received, the designated message being a message transmitted by the terminal to trigger the base station to configure a TCI state set. In an embodiment, the designated message may include respective first messages, i.e., message 1 (Msg.1), corresponding to one or more first SSBs and configured to initiate random access (for example, an Msg.1-i corresponding to an SSB3 #i, an Msg.1-j corresponding to an SSB #j, an Msg.1-k corresponding to an SSB #k and an Msg.1-m corresponding to an SSB #m in FIG. 2B). The first SSB is an SSB detected by the terminal within a designated detection window and capable of triggering random access. A specific implementation process may refer to the embodiment illustrated in FIG. 3.

In an embodiment, the designated message may also include a first set message, i.e., a message 3, carrying a first measurement report and configured to represent contention resolution (for example, an Msg.3 in FIG. 2B). The first measurement report is a measurement report which is obtained after the terminal measures one or more first CSI-RSs corresponding to a second SSB. The second SSB is one of the first SSBs corresponding to respective first messages which are configured for the base station to perform random access feedback. That is, the base station transmits a random access feedback for random access initiated by the second SSB. A specific implementation process may refer to the embodiment illustrated in FIG. 4.

In an embodiment, the designated message may also include a second set message, i.e., a message 3, carrying a second measurement report and configured to represent contention resolution (for example, the Msg.3 in FIG. 2B). The second measurement report is a measurement report which is obtained after the terminal measures one or more second CSI-RSs corresponding to each of one or more third SSBs. The third SSB is selected from respective first SSBs by the terminal, a selection rule may be selecting according to received power of multiple SSBs, and the SSB with higher received power is preferentially selected as the third SSB. A specific implementation process may refer to the embodiment illustrated in FIG. 5.

In an embodiment, the designated message may include a third set message, i.e., a message 3 (Msg.3), carrying a third measurement report and configured to represent contention resolution (for example, an Msg.3 in FIG. 2D). The third measurement report is a measurement report obtained after the terminal measures one or more fourth SSBs and one or more third CSI-RSs corresponding to the fourth SSB, which are designated by the base station for measurement, according to a set measurement rule. A specific implementation process may refer to the embodiment illustrated in FIG. 6.

In an embodiment, the designated message may also include respective first messages, i.e., message 1 (Msg.1), corresponding to one or more fourth CSI-RSs and configured to initiate random access (for example, an Msg.1-k corresponding to a CSI-RS #k and an Msg.1-m corresponding to a CSI-RS #m in FIG. 2C). The fourth CSI-RS is a CSI-RS detected by the terminal within the designated detection window and capable of triggering random access. A specific implementation process may refer to the embodiment illustrated in FIG. 7.

In an embodiment, the designated message may also include a fourth set message, i.e., a message 3, carrying a fourth measurement report and configured to represent contention resolution (for example, an Msg.3 in FIG. 2C). The fourth measurement report is a measurement report which is obtained after the terminal determines one or more fifth SSBs and one or more sixth CSI-RSs and measures the fifth SSBs and the sixth CSI-RSs according to the set measurement rule. A specific implementation process may refer to the embodiment illustrated in FIG. 8.

At block 1420, the TCI state set is configured according to the designated message. For example, the base station determines a TCI state, for example, a TCI #0, corresponding to an SSB #i, according to the designated message. A QCL type corresponding to the TCI #0 is a type D, and the type D is configured for a spatial Rx parameter, i.e., a beam indication. Table 2 shows the TCI state set.

TABLE 2

| TCI state | Reference signal identifier | QCL type | Notes |
|---|---|---|---|
| TCI#0 | SSB#i | Type D | If notifying the terminal to adopt the TCI#0, the base station notifies the terminal to receive the PDCCH or the PDSCH by use of the beam that receives the SSB#i |
| TCI#1 | SSB#j | Type D | |
| TCI#2 | CSI-RS#5 | Type D | |
| TCI#3 | CSI-RS#6 | Type D | |
| . . . | . . . | . . . | |

In an embodiment, the TCI state set configured for the terminal by the base station may include a first TCI state set for PDCCH reception and/or a second TCI state set for PDSCH reception. When the operation at block 930 that the TCI state set is configured for the terminal according to the designated message is executed, the following implementation mode may be adopted where a first TCI state set for PDCCH reception and/or a second TCI state set for PDSCH reception are/is configured for the terminal according to the designated message, wherein the first TCI state set includes a first corresponding relationship between a TCI state identifier for PDCCH reception and at least one of an SSB identifier or a CSI-RS identifier, and the second TCI state set includes a second corresponding relationship between a TCI state identifier for PDSCH reception and at least one of an SSB identifier or a CSI-RS identifier.

The first corresponding relationship may refer to a corresponding relationship between the TCI state identifier for PDCCH reception and at least one of the SSB identifier or the CSI-RS identifier. In addition, a QCL type corresponding to the TCI state identifier for PDCCH reception is the type D, and the type D is configured for the spatial Rx parameter, i.e., the beam indication, referring to the contents illustrated in Table 2.

The second corresponding relationship may refer to a corresponding relationship between the TCI state identifier for PDSCH reception and at least one of the SSB identifier or the CSI-RS identifier. In addition, a QCL type corresponding to the TCI state identifier for PDSCH reception is the type D, and the type D is configured for the spatial Rx parameter, i.e., the beam indication, referring to the contents illustrated in Table 2.

In an embodiment, the method of transmission configuration may further include that the set measurement rule is added to a system message, and the system message is transmitted to the terminal. The set measurement rule can include:

(7-1) a measurement object, the measurement object including one or more SSBs designated by the base station for measurement and/or one or more CSI-RSs corresponding to each SSB designated for measurement;

(7-2) a measurement triggering condition, the measurement triggering condition including a designated measurement triggering threshold value; and (7-3) a configuration of a measurement report, the configuration of the measurement report including a designated content of the measurement report, or the configuration of the measurement report including the designated content of the measurement report and a designated transmission resource of the measurement report.

It can be seen from the embodiment that the designated message transmitted by the terminal in the random process is received, the designated message being a message determined by the terminal to trigger the base station to configure the TCI state set. The TCI state set is configured according to the designated message, so that the transmission configuration efficiency is improved, and a delay is reduced.

Figure 15:
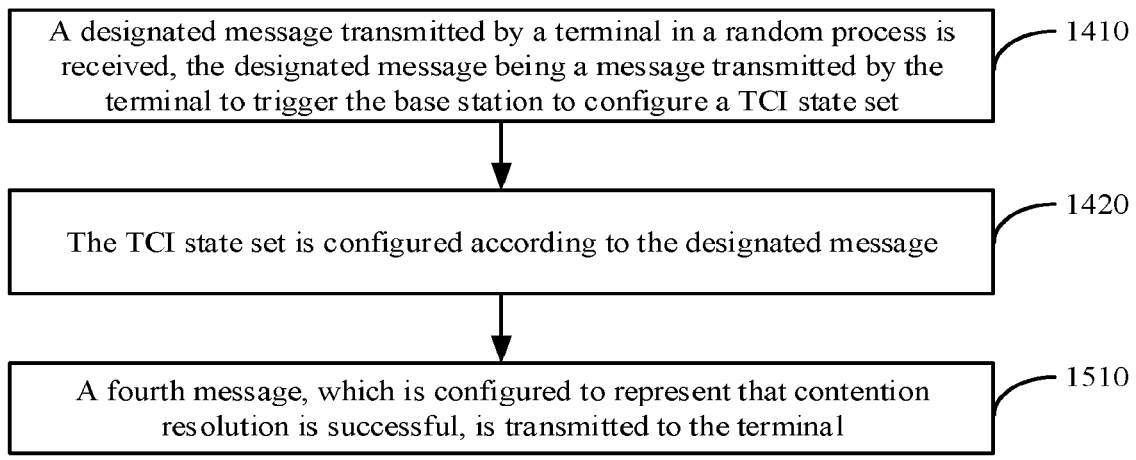
FIG. 15 is a flow chart showing another method of transmission configuration, according to an exemplary embodiment.

FIG. 15 is a flow chart showing another method of transmission configuration, according to an exemplary embodiment. The method of transmission configuration may be applied to a base station and is based on the method illustrated in FIG. 14. As illustrated in FIG. 15, the method of transmission configuration may further include the following operation at block 1510.

Figure 16:
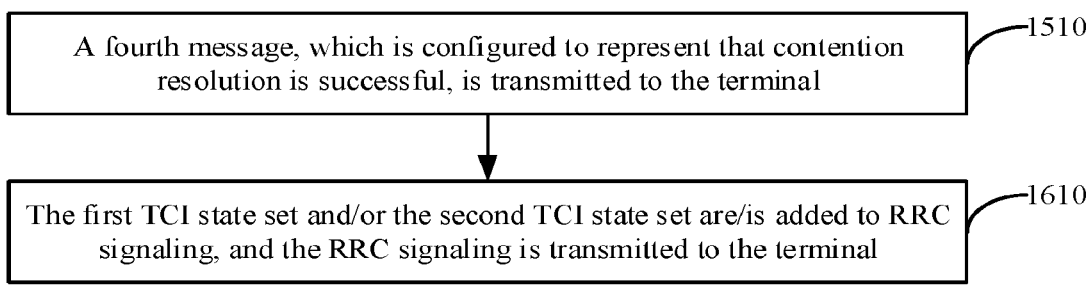
FIG. 16 is a flow chart showing another method of transmission configuration, according to an exemplary embodiment.

At block 1510, a fourth message, which is configured to represent that contention resolution is successful, is transmitted to the terminal. In an embodiment, when or after the operation at block 1510 is executed, as illustrated in FIG. 16, the method of transmission configuration may further include the following operation at block 1610.

At block 1610, the first TCI state set and/or the second TCI state set are/is added to RRC signaling, and the RRC signaling is transmitted to the terminal. It can be seen from the embodiment that, when or after a second designated message configured to represent that the contention resolution is successful is transmitted to the terminal, the first TCI state set and/or the second TCI state may be added to the RRC signaling and the RRC signaling is transmitted to the terminal, so that the reliability of transmitting the TCI state set is improved, and the delay is also avoided.

Figure 17:
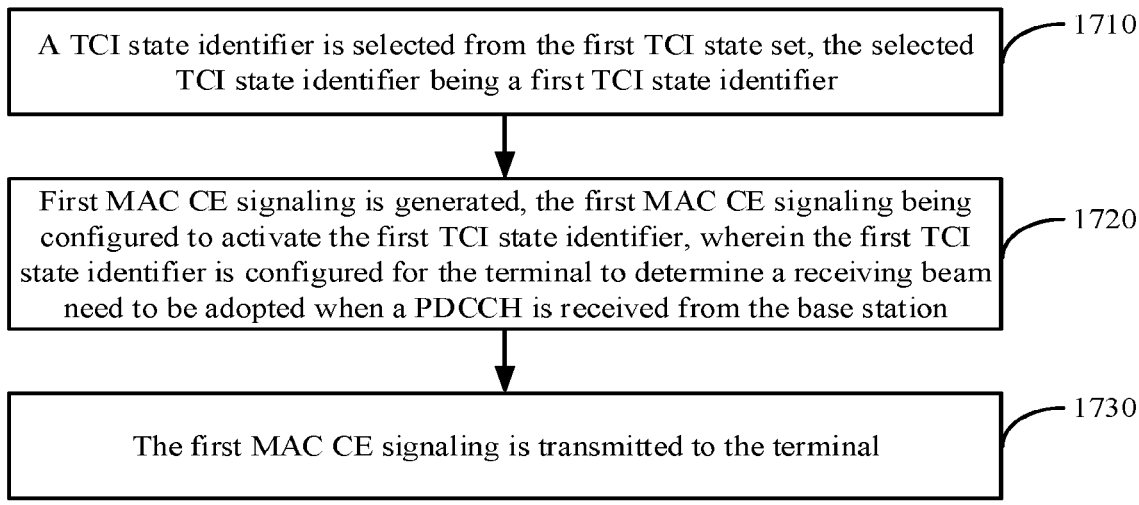
FIG. 17 is a flow chart showing another method of transmission configuration, according to an exemplary embodiment.

FIG. 17 is a flow chart showing another method of transmission configuration, according to an exemplary embodiment. The method of transmission configuration may be applied to a base station and is based on the method illustrated in FIG. 16. The first TCI state set includes at least two TCI state identifiers. As illustrated in FIG. 17, the method of transmission configuration may further include the following operations at blocks 1710 to 1730.

At block 1710, a TCI state identifier is selected from the first TCI state set, the selected TCI state identifier being a first TCI state identifier.

At block 1720, first MAC CE signaling is generated, the first MAC CE signaling being configured to activate the first TCI state identifier, wherein the first TCI state identifier is configured for the terminal to determine a receiving beam needs to be adopted when a PDCCH is received from the base station. At block, the first MAC CE signaling is transmitted to the terminal.

It can be seen from the embodiment that the first TCI state identifier is selected from the first TCI state set, and the first TCI state identifier is activated by using the first MAC CE signaling and is used for the terminal to receive a PDCCH from the base station, so that a transmission configuration for PDCCH reception is implemented, and the reliability of the transmission configuration is also improved.

Figure 18:
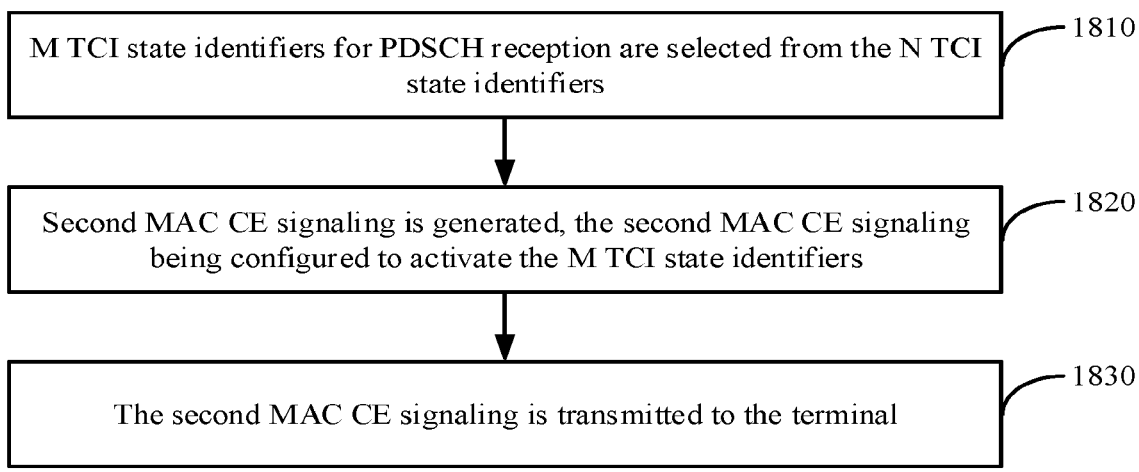
FIG. 18 is a flow chart showing another method of transmission configuration, according to an exemplary embodiment.

FIG. 18 is a flow chart showing another method of transmission configuration, according to an exemplary embodiment. The method of transmission configuration may be applied to a base station and is based on the method illustrated in FIG. 16. The second TCI state set includes N TCI state identifiers, N being greater than 1. As illustrated in FIG. 18, the method of transmission configuration may further include the following operations at blocks 1810 to 1830.

At block 1810, M TCI state identifiers for PDSCH reception are selected from the N TCI state identifiers.

At block 1820, second MAC CE signaling is generated, the second MAC CE signaling being configured to activate the M TCI state identifiers.

At block 1830, the second MAC CE signaling is transmitted to the terminal.

It can be seen from the embodiment that the M TCI state identifiers for PDSCH reception are selected from the N TCI state identifiers. The second MAC CE signaling is generated, the second MAC CE signaling being configured to activate the M TCI state identifiers. The second MAC CE signaling is transmitted to the terminal, so that a transmission configuration for PDSCH reception is implemented, and the reliability of the transmission configuration is also improved.

Figure 19:
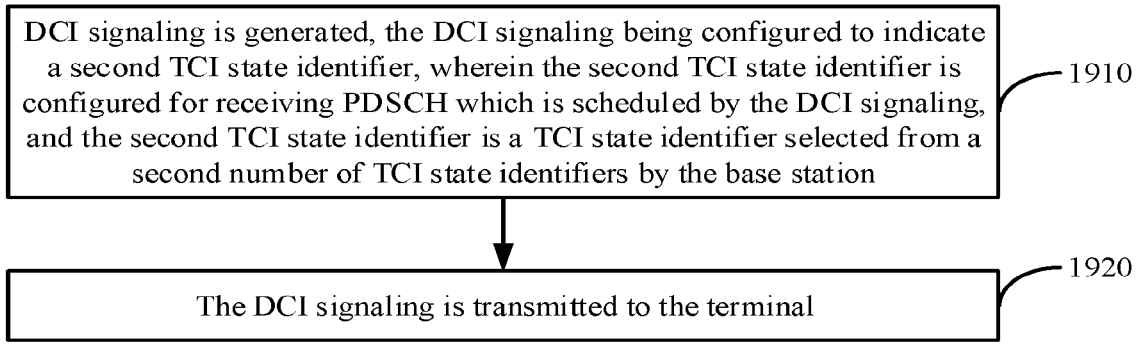
FIG. 19 is a flow chart showing another method of transmission configuration, according to an exemplary embodiment.

FIG. 19 is a flow chart showing another method of transmission configuration, according to an exemplary embodiment. The method of transmission configuration may be applied to a base station and is based on the method illustrated in FIG. 18. M is greater than 1. As illustrated in FIG. 19, the method of transmission configuration may further include the following operations at blocks 1910 to 1920.

At block 1910, DCI signaling is generated, the DCI signaling being configured to indicate a second TCI state identifier, wherein the second TCI state identifier is configured for receiving PDSCH which is scheduled by the DCI signaling, and the second TCI state identifier is a TCI state identifier selected from a second number of TCI state identifiers by the base station.

At block 1920, the DCI signaling is transmitted to the terminal.

It can be seen from the embodiment that the DCI signaling is generated, the DCI signaling being configured to indicate the second TCI state identifier. The second TCI state identifier is configured for receiving PDSCH which is scheduled by the DCI signaling, and the second TCI state identifier is a TCI state identifier selected from the second number of TCI state identifiers by the base station, and the DCI signaling is transmitted to the terminal, so that a transmission configuration for PDSCH reception scheduled by the DCI signaling is implemented, and the reliability of the transmission configuration is also improved.

Corresponding to the embodiments of the methods of transmission configuration, the present disclosure also provides embodiments of devices of transmission configuration.

Figure 20:
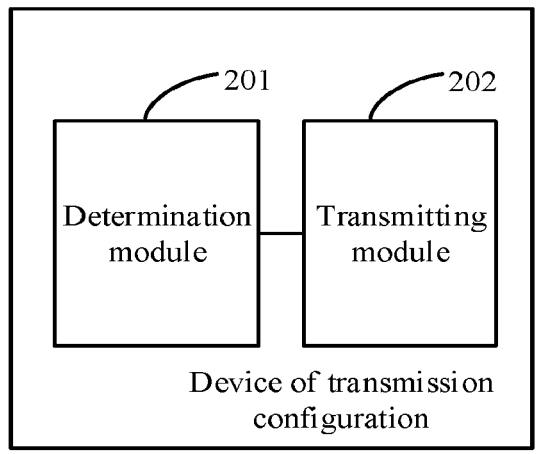
FIG. 20 is a block diagram of a device of transmission configuration, according to an exemplary embodiment.

FIG. 20 is a block diagram of a device of transmission configuration, according to an exemplary embodiment. The device is applied to a terminal, the terminal being UE, and is configured to execute the method of transmission configuration illustrated in FIG. 1. Of course, it should be understood that one or more of the modules can be implemented by, for example, hardware or circuitry.

As illustrated in FIG. 20, the device of transmission configuration may include a determination module 201 that is configured to determine a designated message, the designated message being configured to trigger a base station to configure a TCI state set for the terminal, and a transmitting module 202 that is configured to transmit the designated message to the base station in a random access process such that the base station configures the TCI state set according to the designated message.

It can be seen from the embodiment that the designated message configured to trigger the base station to configure the TCI state set for the terminal is determined, and the designated message is transmitted to the base station in the random access process, such that the base station configures the TCI state set according to the designated message. Therefore, the transmission configuration efficiency is improved, and a delay is reduced.

Figure 21:
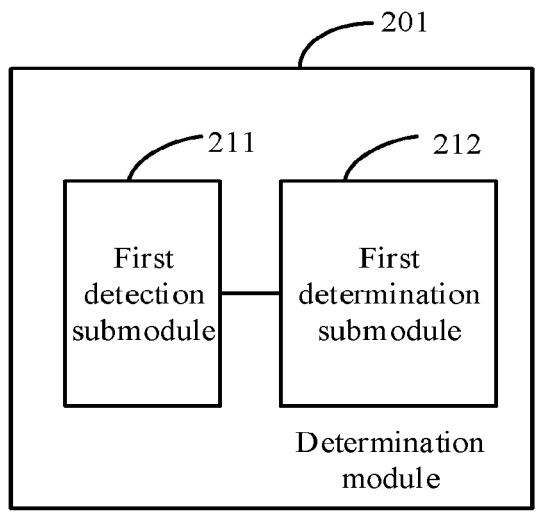
FIG. 21 is a block diagram of another device of transmission configuration, according to an exemplary embodiment.

In an embodiment, based on the device illustrated in FIG. 20, as illustrated in FIG. 21, the determination module 201 may include a first detection submodule 211 that is configured to perform detection within the designated detection window, to obtain one or more first SSBs capable of triggering random access, and a first determination submodule 212 that is configured to determine a first message corresponding to a first SSB and configured to initiate random access as the designated message.

It can be seen from the embodiment that, when one or more first SSBs capable of triggering random access are detected, the first message corresponding to the respective first SSB and configured to initiate random access may be determined as the designated message. The first message corresponding to the respective first SSB and configured to initiate random access is transmitted to the base station in the random access process, such that the base station may configure the TCI state set according to the first message corresponding to the respective first SSB and configured to initiate random access. Therefore, the transmission configuration efficiency is improved, and the delay is reduced.

Figure 22:
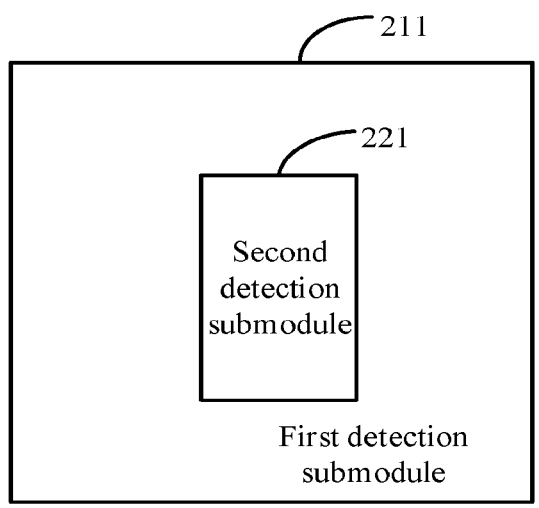
FIG. 22 is a block diagram of another device of transmission configuration, according to an exemplary embodiment.

In an embodiment, based on the device illustrated in FIG. 21, as illustrated in FIG. 22, the first detection submodule 211 may include a second detection submodule 221 that is configured to, when any SSB meeting a designated received power condition is detected within the designated detection window, determine the SSB as the first SSB, wherein an SSB detected at the earliest time within the designated detection window and meeting the designated received power condition is determined as an earliest SSB.

Figure 23:
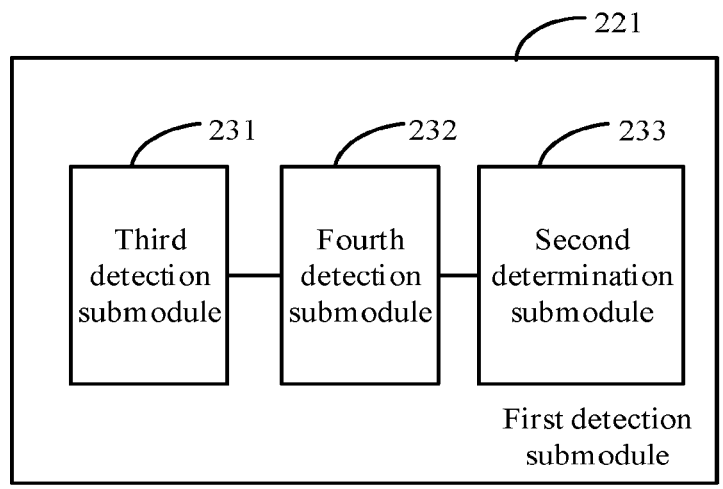
FIG. 23 is a block diagram of another device of transmission configuration, according to an exemplary embodiment.

In an embodiment, based on the device illustrated in FIG. 21, as illustrated in FIG. 23, the first detection submodule 211 may include a third detection submodule 231 that is configured to, when an earliest SSB meeting the designated received power condition is detected within the designated detection window, determine the earliest SSB as the first SSB, a fourth detection submodule 232 that is configured to, when any other SSB meeting the designated received power condition is detected within the designated detection window, calculate a difference value between received power of the earliest SSB and a designated offset value, and a second determination submodule 233 that is configured to, when received power of the other SSB is greater than the difference value, determine the other SSB as the first SSB.

Figure 24:
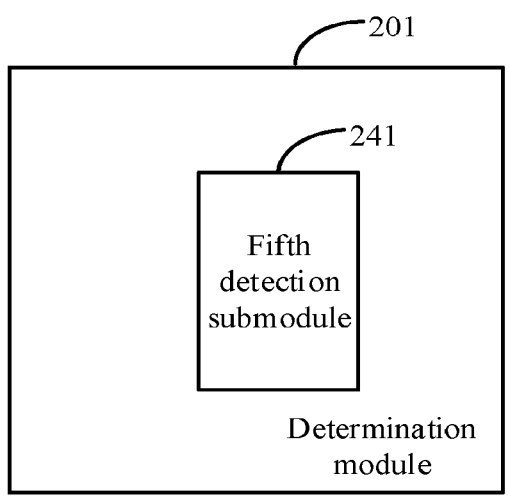
FIG. 24 is a block diagram of another device of transmission configuration, according to an exemplary embodiment.

In an embodiment, based on the device illustrated in FIG. 22 or FIG. 23, as illustrated in FIG. 24, the determination module 201 may further include a fifth detection submodule 241 that is configured to, when it is detected that a first designated stopping condition is met, stop SSB detection, wherein the first designated stopping condition includes at least one of: all SSBs designated by the base station and needs to be detected are detected; or a designated number of first SSBs are detected; or there is a need to start monitoring a random access feedback corresponding to random access which is initiated by the earliest SSB.

Figure 25:
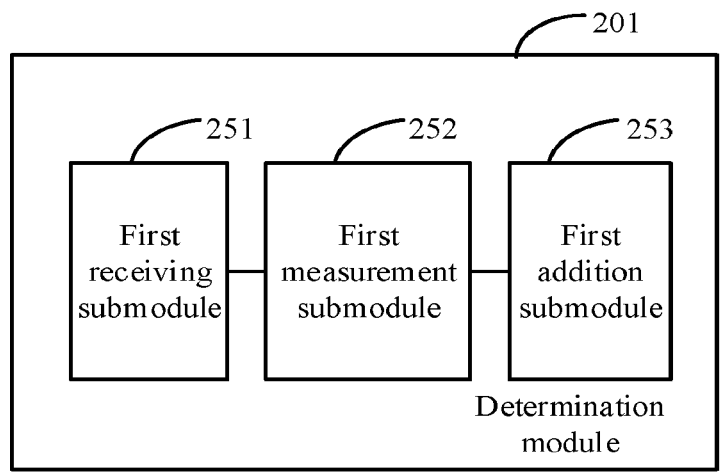
FIG. 25 is a block diagram of another device of transmission configuration, according to an exemplary embodiment.

In an embodiment, based on the device illustrated in FIG. 21, as illustrated in FIG. 25, the determination module 201 may further include a fifth receiving submodule 251 that is configured to receive a second message transmitted by the base station for performing random access feedback for a second SSB, the second SSB being any one of the first SSBs, a first measurement submodule 252 that is configured to measure one or more first CSI-RSs corresponding to the second SSB according to a set measurement rule to obtain a first measurement report, and a first addition submodule 253 that is configured to add the first measurement report to a first set message which is configured to represent contention resolution, and also determine the first set message as the designated message.

It can be seen from the embodiment that, in the random access process, the first set message carrying the first measurement report may also be transmitted to the base station, such that the base station may configure the TCI state set according to the first message, which corresponds to each first SSB and configured to initiate random access, and the first measurement report. Therefore, the transmission configuration efficiency is further improved, and the delay is reduced.

Figure 26:
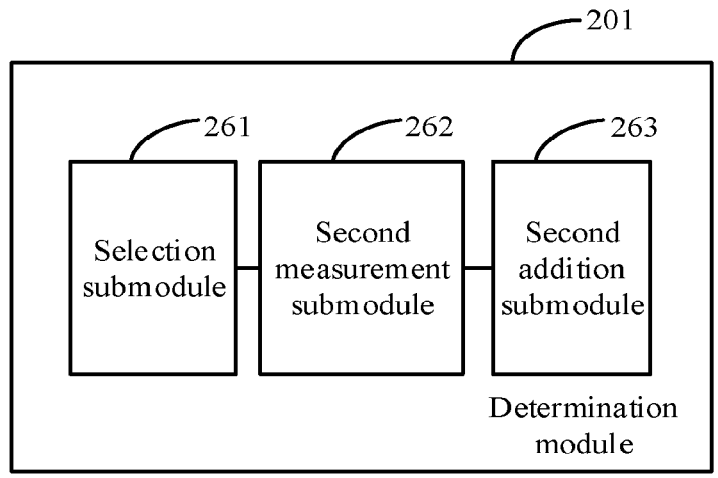
FIG. 26 is a block diagram of another device of transmission configuration, according to an exemplary embodiment.

In an embodiment, based on the device illustrated in FIG. 21 or FIG. 25, as illustrated in FIG. 26, the determination module 201 may further include a selection submodule 261 that is configured to select one or more third SSBs from the first SSBs according to a set selection rule, a second measurement submodule 262 that is configured to measure one or more second CSI-RSs corresponding to a third SSB according to a set measurement rule, to obtain a second measurement report, and a second addition submodule 263 that is configured to add the second measurement report to a second set message which is configured to represent contention resolution, and also determine the second set message as the designated message.

It can be seen from the embodiment that, in the random access process, the second set message carrying the second measurement report may also be transmitted to the base station, such that the base station may configure the TCI state set according to the first message, which corresponds to each first SSB and configured to initiate random access, and the second measurement report. Therefore, the transmission configuration efficiency is further improved, and the delay is reduced.

In an embodiment, based on the device illustrated in FIG. 26, the set selection rule is sequentially selecting according to a descending order of received power of SSBs.

Figure 27:
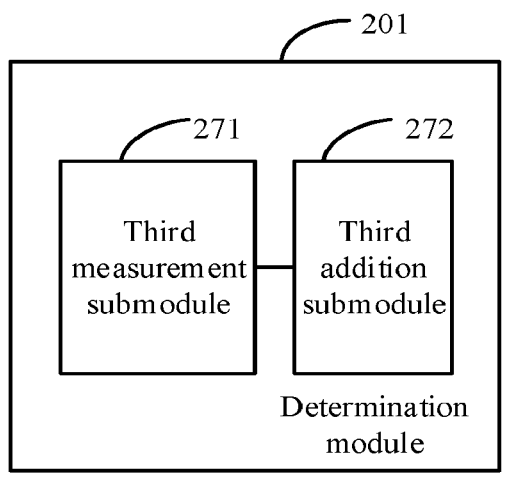
FIG. 27 is a block diagram of another device of transmission configuration, according to an exemplary embodiment.

In an embodiment, based on the device illustrated in FIG. 20, as illustrated in FIG. 27, the determination module 201 may further include a third measurement submodule 271 that is configured to measure one or more fourth SSBs designated by the base station for measurement and one or more third CSI-RSs corresponding to a fourth SSB according to a set measurement rule, to obtain a third measurement report, and a third addition submodule 272 that is configured to add the third measurement report to a third set message which is configured to represent contention resolution, and determine the third set message as the designated message.

It can be seen from the embodiment that, the one or more fourth SSBs designated by the base station for measurement and the one or more third CSI-RSs corresponding to each fourth SSB may be measured according to the set measurement rule to obtain the third measurement report at first. Then the third measurement report is added to the third set message configured to represent contention resolution, the third set message is determined as the designated message.

The third message carrying the third measurement report is transmitted to the base station in the random access process, such that the base station may configure the TCI state set according to the third measurement report. Therefore, the transmission configuration efficiency is improved, and the delay is reduced.

Figure 28:
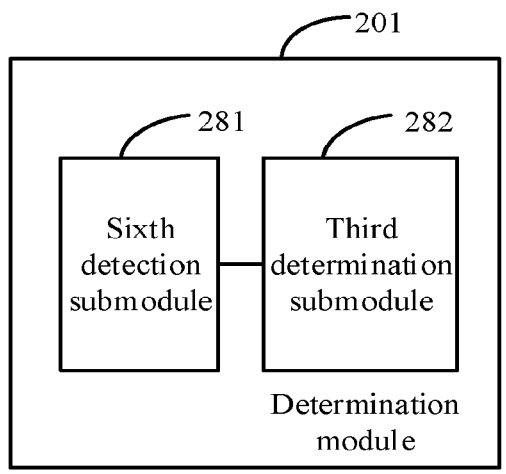
FIG. 28 is a block diagram of another device of transmission configuration, according to an exemplary embodiment.

In an embodiment, based on the device illustrated in FIG. 21, as illustrated in FIG. 28, the determination module 201 may further include a sixth detection submodule 281 that is configured to detect one or more fourth CSI-RSs capable of triggering random access within the designated detection window, and a third determination submodule 282 that is configured to determine a first message corresponding to a fourth CSI-RS and configured to initiate random access as the designated message.

It can be seen from the embodiment that, fourth CSI-RSs capable of triggering random access may be detected at the same time of detecting the first SSBs capable of triggering random access. When one or more fourth CSI-RSs capable of triggering random access are detected within the designated detection window, the first message corresponding to the fourth CSI-RS and configured to initiate random access may also be determined as the designated message, and the first message corresponding to the fourth CSI-RS and configured to initiate random access is also transmitted to the base station in the random process, such that the base station may configure the TCI state set according to the first message corresponding to the first SSB and the first message corresponding to the fourth CSI-RS. Therefore, the transmission configuration efficiency is improved, and the delay is reduced.

Figure 29:
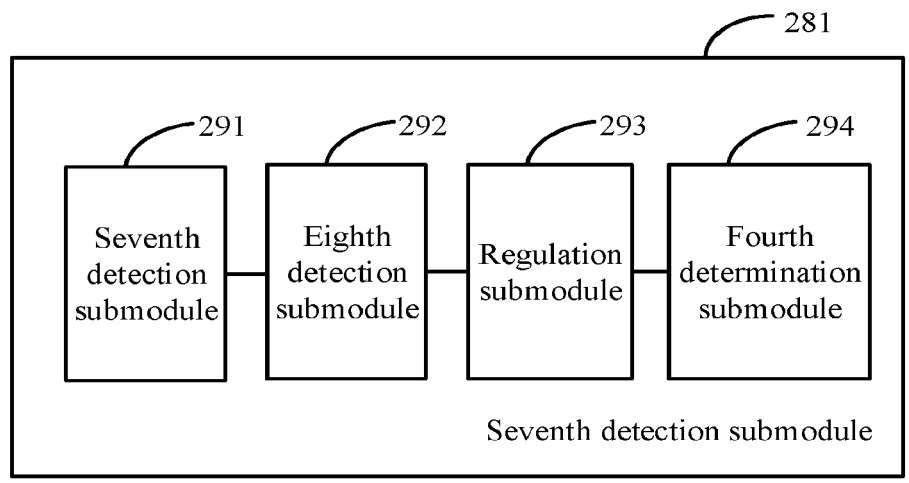
FIG. 29 is a block diagram of another device of transmission configuration, according to an exemplary embodiment.

In an embodiment, based on the device illustrated in FIG. 28, as illustrated in FIG. 29, the sixth detection submodule 281 may include a seventh detection submodule 291 that is configured to detect an earliest SSB meeting a first designated received power condition within the designated detection window, an eighth detection submodule 292 that is configured to, when any fifth CSI-RS meeting a second designated received power condition is detected within the designated detection window, calculate a first difference value between received power of the earliest SSB and the designated offset value, a regulation submodule 293 that is configured to regulate received power of the fifth CSI-RS according to a designated transmitted power difference value between an SSB and a CSI-RS to obtain regulated received power, and a fourth determination submodule 294 that is configured to, when the regulated received power is greater than the first difference value, determine the fifth CSI-RS as the fourth CSI-RS.

Figure 30:
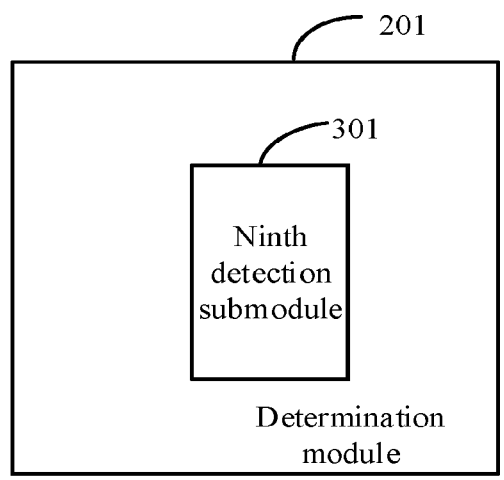
FIG. 30 is a block diagram of another device of transmission configuration, according to an exemplary embodiment.

In an embodiment, based on the device illustrated in FIG. 29, as illustrated in FIG. 30, the determination module 201 may further include a ninth detection submodule 301 that is configured to, when it is detected that a second designated stopping condition is met, stop SSB detection and CSI-RS detection. The second designated stopping condition includes at least one of all SSBs and CSI-RSs designated by the base station and need to be detected are detected, a designated number of first SSBs and fourth CSI-RSs are detected; or there is a need to start monitoring a random access feedback corresponding to random access which is initiated by the earliest SSB.

Figure 31:
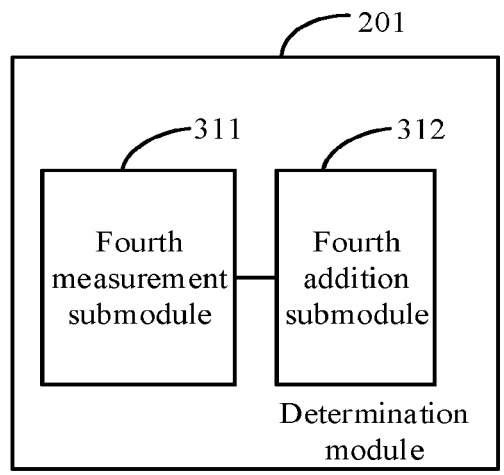
FIG. 31 is a block diagram of another device of transmission configuration, according to an exemplary embodiment.

In an embodiment, based on the device illustrated in FIG. 28, as illustrated in FIG. 31, the determination module 201 may further include a fourth measurement submodule 311 that is configured to, according to the set measurement rule, determine one or more fifth SSBs and one or more sixth CSI-RSs and measure the fifth SSBs and the sixth CSI-RSs to obtain a fourth measurement report, and a fourth addition submodule 312 that is configured to add the fourth measurement report to a fourth set message which is configured to represent contention resolution, and determine the fourth set message as the designated message.

It can be seen from the embodiment that the fourth set message carrying the fourth measurement report may also be transmitted to the base station, such that the base station may configure the TCI state set according to the first message corresponding to each first SSB, the first message corresponding to each fourth CSI-RS and the fourth measurement report. Therefore, the transmission configuration efficiency is further improved, and the delay is reduced.

Figure 32:
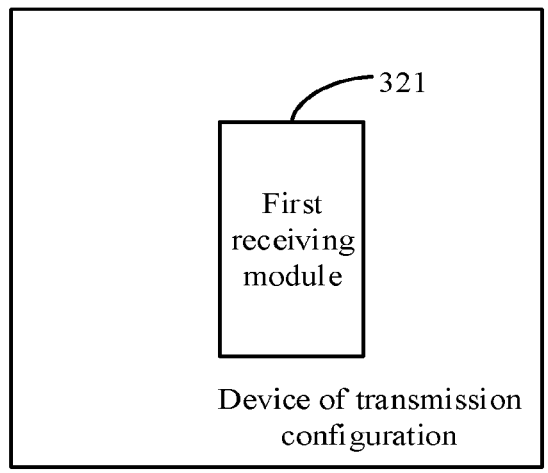
FIG. 32 is a block diagram of another device of transmission configuration, according to an exemplary embodiment.

In an embodiment, based on the device illustrated in FIG. 25 or FIG. 26 or FIG. 27 or FIG. 31, as illustrated in FIG. 32, the device may further include a first receiving module 321 that is configured to receive a system message transmitted by the base station, the system message including the set measurement rule. The set measurement rule includes a measurement object, the measurement object including one or more SSBs designated by the base station for measurement and one or more CSI-RSs corresponding to each SSB designated for measurement, a measurement triggering condition, the measurement triggering condition including a designated measurement triggering threshold value, and a configuration of a measurement report, the configuration of the measurement report including a designated content of the measurement report, or the designated content of the measurement report and a designated transmission resource of the measurement report.

Figure 33:
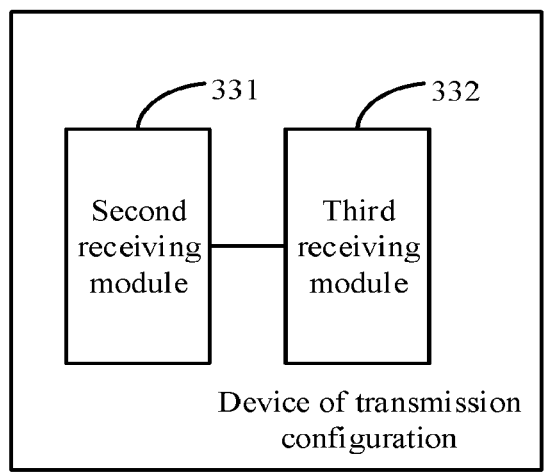
FIG. 33 is a block diagram of another device of transmission configuration, according to an exemplary embodiment.

In an embodiment, based on the device illustrated in FIG. 20, as illustrated in FIG. 33, the device may further include a second receiving module 331 that is configured to receive a fourth message transmitted by the base station and configured to represent that contention resolution is successful, and a third receiving module 332 that is configured to receive RRC signaling transmitted by the base station, the RRC signaling including a first TCI state set for PDCCH reception and/or a second TCI state set for PDSCH reception, which are/is configured for the terminal by the base station, wherein the first TCI state set includes a first corresponding relationship between a TCI state identifier for PDCCH reception and at least one of an SSB identifier or a CSI-RS identifier, and the second TCI state set includes a second corresponding relationship between a TCI state identifier for PDSCH reception and at least one of an SSB identifier or a CSI-RS identifier.

It can be seen from the embodiment that, when or after the fourth message, which is transmitted by the base station and configured to represent that the contention resolution is successful, is received, the RRC signaling transmitted by the base station is received. The RRC signaling includes the first TCI state set for PDCCH reception and/or the second TCI state set for PDSCH reception, which are/is configured for the terminal by the base station, so that the reliability of receiving the TCI state set is improved, and the delay is also avoided.

Figure 34:
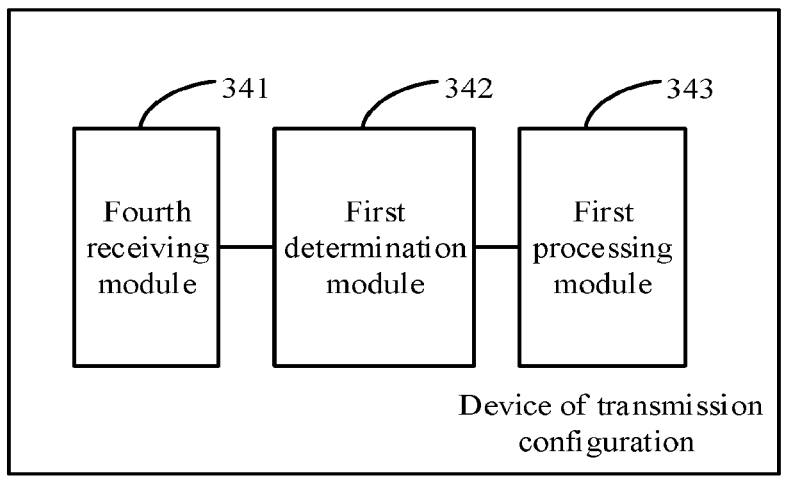
FIG. 34 is a block diagram of another device of transmission configuration, according to an exemplary embodiment.

In an embodiment, based on the device illustrated in FIG. 33, the first TCI state set includes at least two TCI state identifiers, and as illustrated in FIG. 34, the device may further include a fourth receiving module 341 that is configured to receive first MAC CE signaling transmitted by the base station, the first MAC CE signaling being configured to activate a first TCI state identifier, wherein the first TCI state identifier is a TCI state identifier selected from the first TCI state set by the base station, and the first TCI state identifier is configured for the terminal to determine a receiving beam needs to be adopted when a PDCCH is received from the base station, a first determination module 342 that is configured to determine a first SSB identifier and/or first CSI-RS identifier corresponding to the first TCI state identifier according to the first corresponding relationship, and a first processing module 343 that is configured to adopt, when receiving the PDCCH, a first receiving beam which is same as that receiving an SSB designated by the first SSB identifier and/or a CSI-RS designated by the first CSI-RS identifier.

It can be seen from the embodiment that the first MAC CE signaling transmitted by the base station is received, the first MAC CE signaling being configured to activate the first TCI state identifier and the first TCI state identifier being selected from the first TCI state set by the base station. The first SSB identifier and/or first CSI-RS identifier corresponding to the first TCI state identifier are/is determined according to the first corresponding relationship. When receiving the PDCCH, a first receiving beam, which is same as that receiving the SSB designated by the first SSB identifier and/or the CSI-RS designated by the first CSI-RS identifier, is adopted, so that a transmission configuration for PDCCH reception is implemented, and the reliability of the transmission configuration is also improved.

Figure 35:
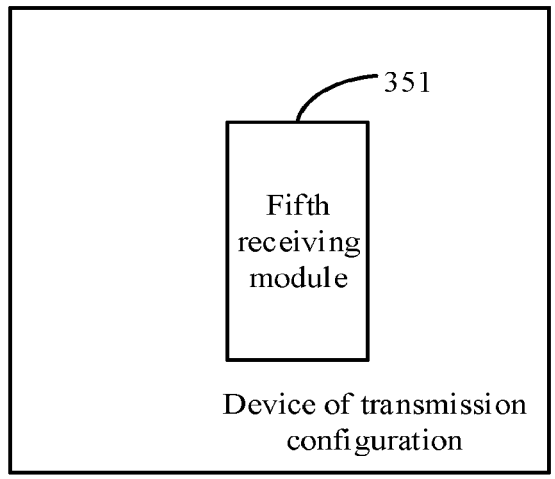
FIG. 35 is a block diagram of another device of transmission configuration, according to an exemplary embodiment.

In an embodiment, based on the device illustrated in FIG. 33, the second TCI state set includes N TCI state identifiers, N being greater than 1; and as illustrated in FIG. 35, the device may further include a fifth receiving module 351 that is configured to receive second MAC CE signaling transmitted by the base station, the second MAC CE signaling being configured to activate M TCI state identifiers, wherein the M TCI state identifiers are configured for PDSCH reception, and the M TCI state identifiers are selected from the N TCI state identifiers by the base station.

It can be seen from the embodiment that the second MAC CE signaling transmitted by the base station is received, the second MAC CE signaling being configured to activate the M TCI state identifiers and the M TCI state identifiers being configured for PDSCH reception. The M TCI state identifiers are selected from the N TCI state identifiers, so that a transmission configuration for PDSCH reception is implemented, and the reliability of the transmission configuration is also improved.

Figure 36:
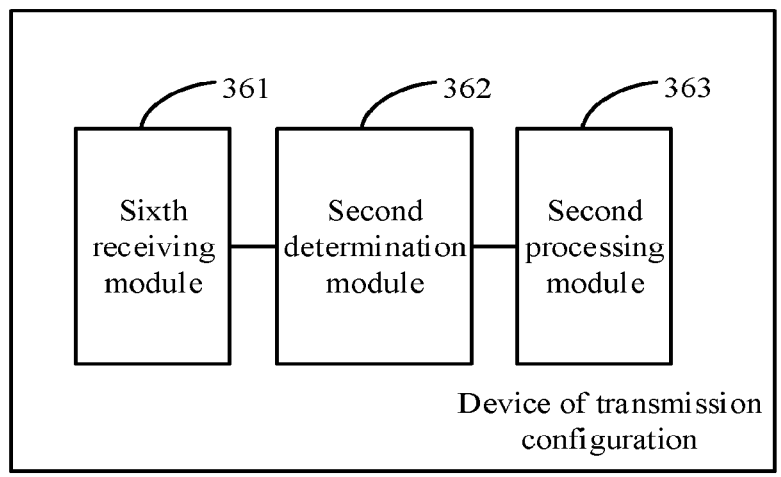
FIG. 36 is a block diagram of another device of transmission configuration, according to an exemplary embodiment.

In an embodiment, based on the device illustrated in FIG. 35, M is greater than 1, and as illustrated in FIG. 36. The device may further include a sixth receiving module 361 that is configured to receive DCI signaling transmitted by the base station, the DCI signaling being configured to indicate a second TCI state identifier, wherein the second TCI state identifier is configured for receiving PDSCH which is scheduled by the DCI signaling, and the second TCI state identifier is a TCI state identifier selected from the M TCI state identifiers by the base station, a second determination module 362 that is configured to determine a second SSB identifier and/or second CSI-RS identifier corresponding to the second TCI state identifier according to the second corresponding relationship, an a second processing module 363 that is configured to, when receiving a PDSCH scheduled by the DCI signaling, adopt a second receiving beam which is same as that receiving an SSB designated by the second SSB identifier and/or a CSI-RS designated by the second CSI-RS identifier.

It can be seen from the embodiment that the DCI signaling transmitted by the base station is received, the DCI signaling being configured to indicate the second TCI state identifier. The second TCI state identifier is configured for receiving PDSCH which is scheduled by the DCI signaling, and the second TCI state identifier is a TCI state identifier selected from the M TCI state identifiers by the base station. The second SSB identifier and/or second CSI-RS identifier corresponding to the second TCI state identifier are/is determined according to the second corresponding relationship. When receiving the PDSCH scheduled by the DCI signaling, a second receiving beam, which is same as that receiving the SSB designated by the second SSB identifier and/or the CSI-RS designated by the second CSI-RS identifier, is adopted, so that a transmission configuration for PDSCH reception scheduled by the DCI signaling is implemented, and the reliability of the transmission configuration is also improved.

Figure 37:
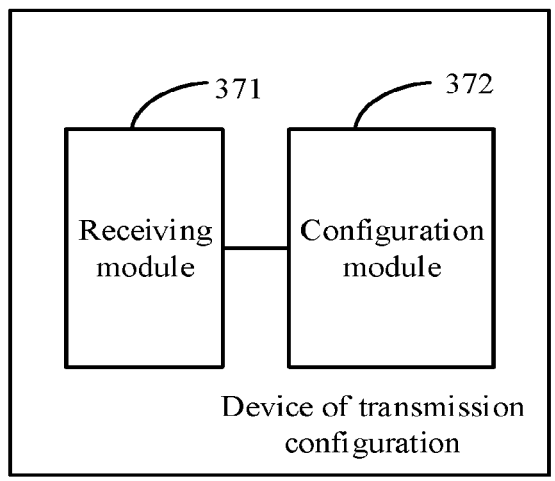
FIG. 37 is a block diagram of a device of transmission configuration, according to an exemplary embodiment.

FIG. 37 is a block diagram of a device of transmission configuration, according to an exemplary embodiment. The device is applied to a base station and configured to execute the method of transmission configuration illustrated in FIG. 14. As illustrated in FIG. 37. The device of transmission configuration may include a receiving module 371 that is configured to receive a designated message transmitted by a terminal in a random process, the designated message being a message transmitted by the terminal to trigger the base station to configure a TCI state set, an a configuration module 372 that is configured to configure the TCI state set according to the designated message.

It can be seen from the embodiment that the designated message transmitted by the terminal in the random process is received, the designated message being a message determined by the terminal to trigger the base station to configure the TCI state set, and the TCI state set is configured according to the designated message, so that the transmission configuration efficiency is improved, and a delay is reduced.

In an embodiment, based on the device illustrated in FIG. 37, the designated message may include respective first messages corresponding to one or more first SSBs and configured to initiate random access, and a first SSB is an SSB detected by the terminal within a designated detection window and capable of triggering random access.

In an embodiment, based on the device illustrated in FIG. 37, the designated message may also include a first set message carrying a first measurement report and configured to represent contention resolution. The first measurement report is a measurement report which is obtained after the terminal measures one or more first CSI-RSs corresponding to a second SSB, and the second SSB is one of the first SSBs corresponding to respective first messages which are configured for the base station to perform random access feedback.

In an embodiment, based on the device illustrated in FIG. 37, the designated message may also include a second set message carrying a second measurement report and configured to represent contention resolution, the second measurement report is a measurement report which is obtained after the terminal measures one or more second CSI-RSs corresponding to each of one or more third SSBs, and a third SSB is selected from respective first SSBs by the terminal.

In an embodiment, based on the device illustrated in FIG. 37, the designated message may include a third set message carrying a third measurement report and configured to represent contention resolution, and the third measurement report is a measurement report obtained after the terminal measures one or more fourth SSBs and one or more third CSI-RSs corresponding to a fourth SSB, which are designated by the base station for measurement, according to a set measurement rule.

In an embodiment, based on the device illustrated in FIG. 37, the designated message may also include respective first messages corresponding to one or more fourth CSI-RSs and configured to initiate random access, and a fourth CSI-RS is a CSI-RS detected by the terminal within the designated detection window and capable of triggering random access.

In an embodiment, based on the device illustrated in FIG. 37, the designated message may also include a fourth set message carrying a fourth measurement report and configured to represent contention resolution, and the fourth measurement report is a measurement report which is obtained after the terminal determines one or more fifth SSBs and one or more sixth CSI-RSs and measures the fifth SSBs and the sixth CSI-RSs according to the set measurement rule.

Figure 38:
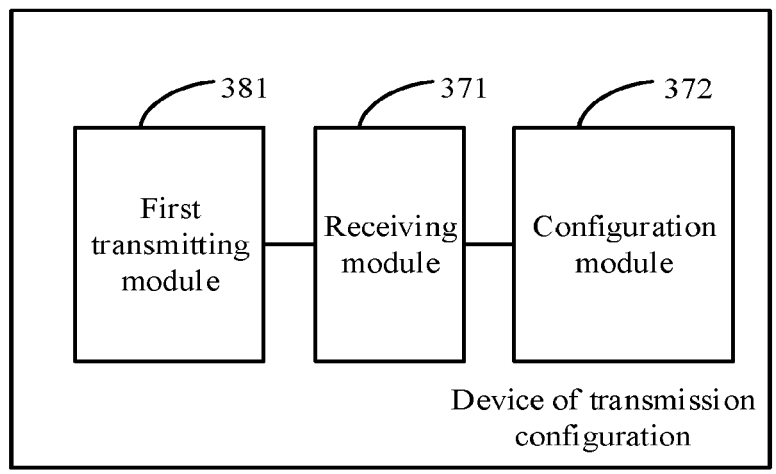
FIG. 38 is a block diagram of another device of transmission configuration, according to an exemplary embodiment.

In an embodiment, based on the device illustrated in FIG. 37, as illustrated in FIG. 38, the device may further include a first transmitting module 381 that is configured to add the set measurement rule to a system message and transmit the system message to the terminal. The set measurement rule includes a measurement object, the measurement object including one or more SSBs designated by the base station for measurement and/or one or more CSI-RSs corresponding to each SSB designated for measurement, a measurement triggering condition, the measurement triggering condition including a designated measurement triggering threshold value, and a configuration of a measurement report, the configuration of the measurement report including a designated content of the measurement report, or the designated content of the measurement report and a designated transmission resource of the measurement report.

Figure 39:
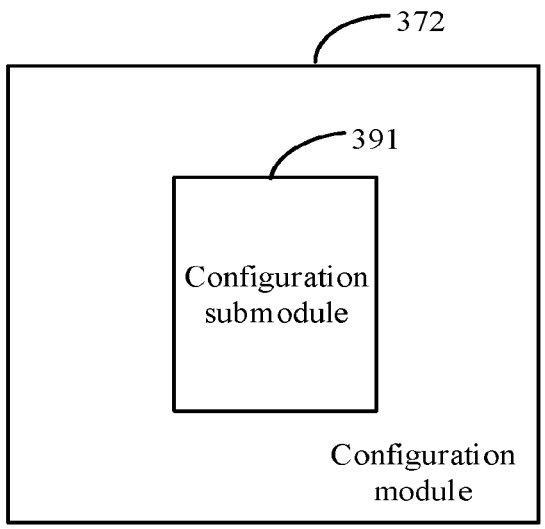
FIG. 39 is a block diagram of another device of transmission configuration, according to an exemplary embodiment.

In an embodiment, based on the device illustrated in FIG. 37, as illustrated in FIG. 39, the configuration module 372 may include a configuration submodule 391 that is configured to configure a first TCI state set for PDCCH reception and/or a second TCI state set for PDSCH reception for the terminal according to the designated message, wherein the first TCI state set includes a first corresponding relationship between a TCI state identifier for PDCCH reception and at least one of an SSB identifier or a CSI-RS identifier, and the second TCI state set includes a second corresponding relationship between a TCI state identifier for PDSCH reception and at least one of an SSB identifier or a CSI-RS identifier.

Figure 40:
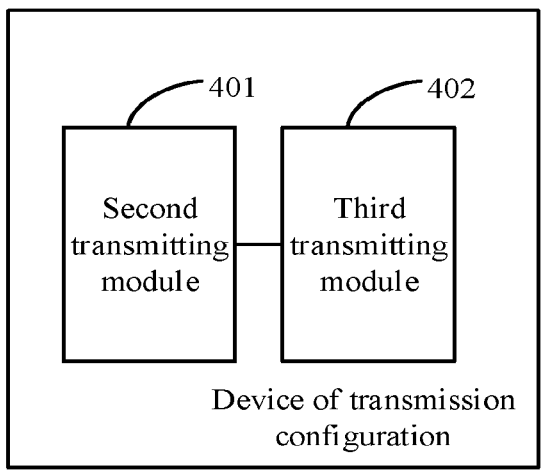
FIG. 40 is a block diagram of another device of transmission configuration, according to an exemplary embodiment.

In an embodiment, based on the device illustrated in FIG. 39, as illustrated in FIG. 40, the device may further include a second transmitting module 401 that is configured to transmit a fourth message, which is configured to represent that contention resolution is successful, to the terminal, and a third transmitting module 402 that is configured to add the first TCI state set and/or the second TCI state set to RRC signaling and transmit the RRC signaling to the terminal.

It can be seen from the embodiment that, when or after a second designated message, which is configured to represent that the contention resolution is successful, is transmitted to the terminal, the first TCI state set and/or the second TCI state may be added to the RRC signaling, and the RRC signaling is transmitted to the terminal, so that the reliability of transmitting the TCI state set is improved, and the delay is also avoided.

Figure 41:
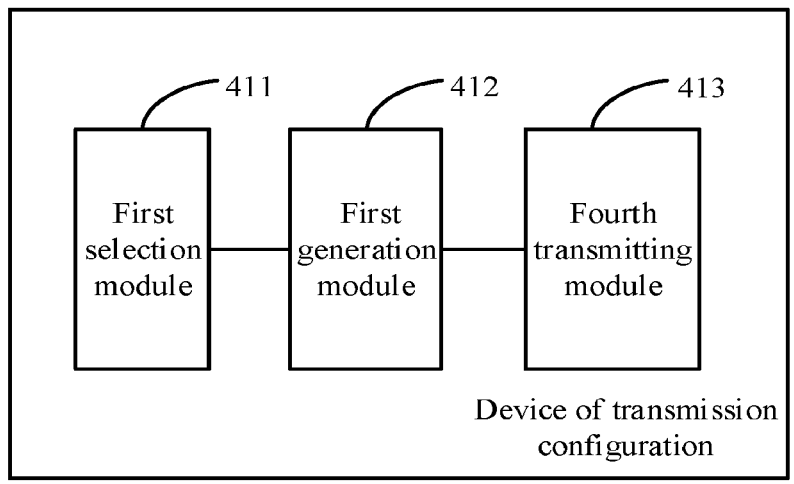
FIG. 41 is a block diagram of another device of transmission configuration, according to an exemplary embodiment.

In an embodiment, based on the device illustrated in FIG. 40, the first TCI state set includes at least two TCI state identifiers, and as illustrated in FIG. 41, the device may further include a first selection module 411 that is configured to select a TCI state identifier from the first TCI state set, the selected TCI state identifier being a first TCI state identifier, a first generation module 412 that is configured to generate first MAC CE signaling, the first MAC CE signaling being configured to activate the first TCI state identifier, wherein the first TCI state identifier is configured for the terminal to determine a receiving beam needs to be adopted when a PDCCH is received from the base station, and a fourth transmitting module 413 that is configured to transmit the first MAC CE signaling to the terminal.

It can be seen from the embodiment that the first TCI state identifier is selected from the first TCI state set, and the first TCI state identifier is activated by use of the first MAC CE signaling and is used for the terminal to receive a PDCCH from the base station, so that a transmission configuration for PDCCH reception is implemented, and the reliability of the transmission configuration is also improved.

Figure 42:
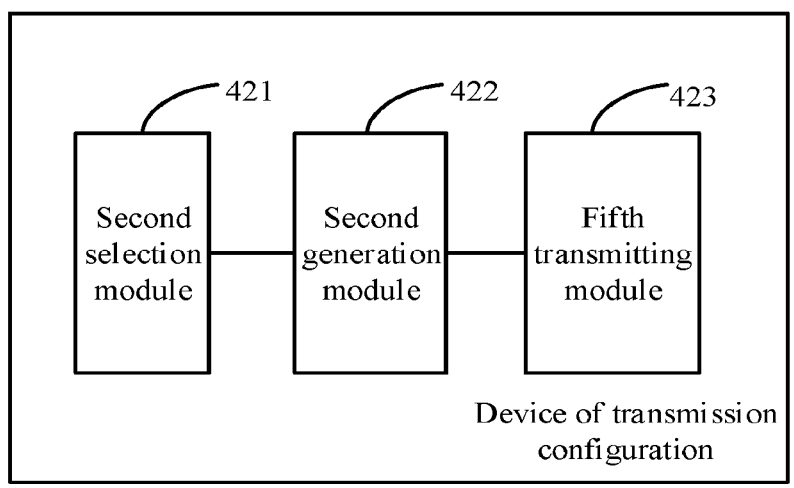
FIG. 42 is a block diagram of another device of transmission configuration, according to an exemplary embodiment.

In an embodiment, based on the device illustrated in FIG. 40, the second TCI state set includes N TCI state identifiers, N being greater than 1. As illustrated in FIG. 42, the device may further include a second selection module 421 that is configured to select M TCI state identifiers for PDSCH reception from the N TCI state identifiers a second generation module 422 that is configured to generate second MAC CE signaling, the second MAC CE signaling being configured to activate the M TCI state identifiers, and a fifth transmitting module 423 that is configured to transmit the second MAC CE signaling to the terminal.

It can be seen from the embodiment that the M TCI state identifiers for PDSCH reception are selected from the N TCI state identifiers. The second MAC CE signaling is generated, the second MAC CE signaling being configured to activate the M TCI state identifiers. The second MAC CE signaling is transmitted to the terminal, so that a transmission configuration for PDSCH reception is implemented, and the reliability of the transmission configuration is also improved.

Figure 43:
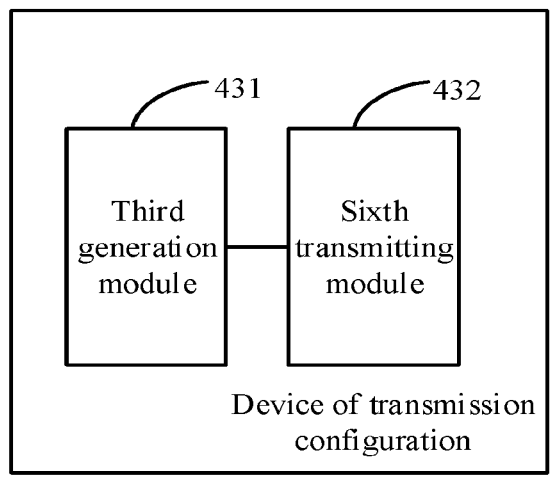
FIG. 43 is a block diagram of another device of transmission configuration, according to an exemplary embodiment.

In an embodiment, based on the device illustrated in FIG. 42, the second number is larger than 1, and as illustrated in FIG. 43, the device may further include a third generation module 431 that is configured to generate DCI signaling, the DCI signaling being configured to indicate a second TCI state identifier, wherein the second TCI state identifier is configured for receiving PDSCH which is scheduled by the DCI signaling, and the second TCI state identifier is a TCI state identifier selected from the M TCI state identifiers by the base station, and a sixth transmitting module 432 that is configured to transmit the DCI signaling to the terminal.

It can be seen from the embodiment that the DCI signaling is generated, the DCI signaling being configured to indicate the second TCI state identifier. The second TCI state identifier is configured for receiving PDSCH which is scheduled by the DCI signaling, and the second TCI state identifier is a TCI state identifier selected from the M TCI state identifiers by the base station, and the DCI signaling is transmitted to the terminal, so that a transmission configuration for PDSCH reception scheduled by the DCI signaling is implemented, and the reliability of the transmission configuration is also improved.

The device embodiments substantially correspond to the method embodiments, and thus related parts refer to part of descriptions of the method embodiments. The device embodiments described above are only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the present disclosure. Those of ordinary skill in the art may understand and implement without creative work.

The present disclosure also provides a non-transitory computer-readable storage medium, on which a computer program is stored. The computer program is configured to execute the method of transmission configuration illustrated in any one of FIG. 1 to FIG. 13.

The present disclosure also provides a non-transitory computer-readable storage medium, on which a computer program is stored. The computer program is configured to execute the method of transmission configuration illustrated in any one of FIG. 14 to FIG. 19.

The present disclosure also provides a device of transmission configuration, which is applied to a terminal and includes a processor and a memory configured to store instructions executable for the processor. The processor is configured to determine a designated message, the designated message being configured to trigger a base station to configure a TCI state set for the terminal, and transmit the designated message to the base station in a random access process, such that the base station configures the TCI state set according to the designated message.

Figure 44:
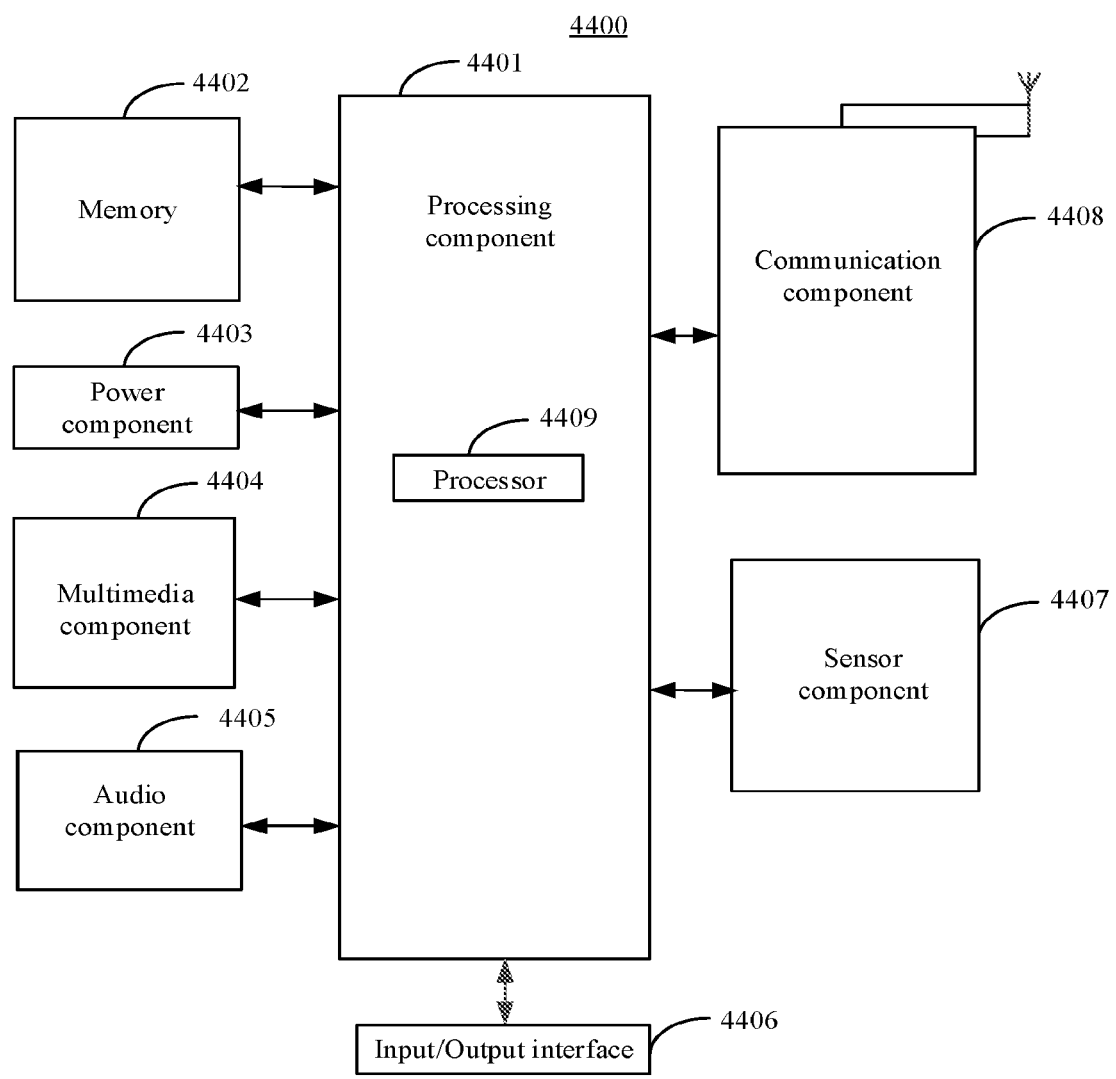
FIG. 44 is a schematic structure diagram of a device of transmission configuration, according to an exemplary embodiment.

FIG. 44 is a structure diagram of a device of transmission configuration, according to an exemplary embodiment. FIG. 44 illustrates a device 4400 of transmission configuration according to an exemplary embodiment. The device 4400 may be a terminal such as a computer, a mobile phone, a digital broadcast terminal, a messaging device, a gaming console, a tablet, a medical device, exercise equipment and a personal digital assistant.

Referring to FIG. 44, the device 4400 may include one or more of the following components: a processing component 4401, a memory 4402, a power component 4403, a multimedia component 4404, an audio component 4405, an Input/Output (I/O) interface 4406, a sensor component 4407, and a communication component 4408.

The processing component 4401 typically controls overall operations of the device 4400, such as the operations associated with display, telephone calls, data communications, camera operations, and recording operations. The processing component 4401 may include one or more processors 4409 to execute instructions to perform all or part of the steps in the abovementioned method. Moreover, the processing component 4401 may include one or more modules which facilitate interaction between the processing component 4401 and the other components. For instance, the processing component 4401 may include a multimedia module to facilitate interaction between the multimedia component 4404 and the processing component 4401.

The memory 4402 is configured to store various types of data to support the operation of the device 4400. Examples of such data include instructions for any applications or methods operated on the device 4400, contact data, phonebook data, messages, pictures, video, and the like. The memory 4402 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 4403 provides power for various components of the device 4400. The power component 4403 may include a power management system, one or more power supplies, and other components associated with generation, management and distribution of power for the device 4400.

The multimedia component 4404 includes a screen providing an output interface between the device 4400 and a user. In some embodiments, the screen may include a Liquid Crystal Display (LCD) and a Touch Panel (TP). If the screen includes the TP, the screen may be implemented as a touch screen to receive an input signal from the user. The touch panel includes one or more touch sensors to sense touches, swipes and gestures on the touch panel. The touch sensors may not only sense a boundary of a touch or swipe action but also detect a duration and pressure associated with the touch or swipe action. In some embodiments, the multimedia component 4404 includes a front camera and/or a rear camera. The front camera and/or the rear camera may receive external multimedia data when the device 4400 is in an operation mode, such as a photographing mode or a video mode. Each of the front camera and the rear camera may be a fixed optical lens system or have focusing and optical zooming capabilities.

The audio component 4405 is configured to output and/or input an audio signal. For example, the audio component 4405 includes a Microphone (MIC), and the MIC is configured to receive an external audio signal when the device 4400 is in the operation mode, such as a call mode, a recording mode and a voice recognition mode. The received audio signal may further be stored in the memory 4402 or transmitted through the communication component 4408. In some embodiments, the audio component 4405 further includes a speaker configured to output the audio signal.

The I/O interface 4406 provides an interface between the processing component 4401 and a peripheral interface module, and the peripheral interface module may be a keyboard, a click wheel, a button and the like. The button may include, but not limited to: a home button, a volume button, a starting button and a locking button.

The sensor component 4407 includes one or more sensors configured to provide status assessment in various aspects for the device 4400. For instance, the sensor component 4407 may detect an on/off status of the device 4400 and relative positioning of components, such as a display and small keyboard of the device 4400, and the sensor component 4407 may further detect a change in a position of the device 4400 or a component of the device 4400, presence or absence of contact between the user and the device 4400, orientation or acceleration/deceleration of the device 4400 and a change in temperature of the device 4400. The sensor component 4407 may include a proximity sensor configured to detect presence of an object nearby without any physical contact. The sensor component 4407 may also include a light sensor, such as a Complementary Metal Oxide Semiconductor (CMOS) or Charge Coupled Device (CCD) image sensor, configured for use in an imaging application. In some embodiments, the sensor component 4407 may also include an acceleration sensor, a gyroscope sensor, a magnetic sensor, a pressure sensor or a temperature sensor.

The communication component 4408 is configured to facilitate wired or wireless communication between the device 4400 and another device. The device 4400 may access any communication-standard-based wireless network, such as a Wireless Fidelity (WiFi) network, a 2nd-Generation (2G) or 3rd-Generation (3G) network or a combination thereof. In an exemplary embodiment, the communication component 4408 receives a broadcast signal or broadcast associated information from an external broadcast management system through a broadcast channel. In an exemplary embodiment, the communication component 4408 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the device 4400 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 4402 including an instruction, and the instruction may be executed by the processor 4409 of the device 4400 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

When the instructions in the storage medium are executed by the processor, the device 4400 may execute any of the above methods of transmission configuration.

The present disclosure also provides a device of transmission configuration, which is applied to a base station and includes a processor and a memory configured to store instructions executable for the processor. The processor is configured to receive a designated message transmitted by a terminal in a random process, the designated message being a message transmitted by the terminal to trigger the base station to configure a TCI state set, and configure the TCI state set according to the designated message.

Figure 45:
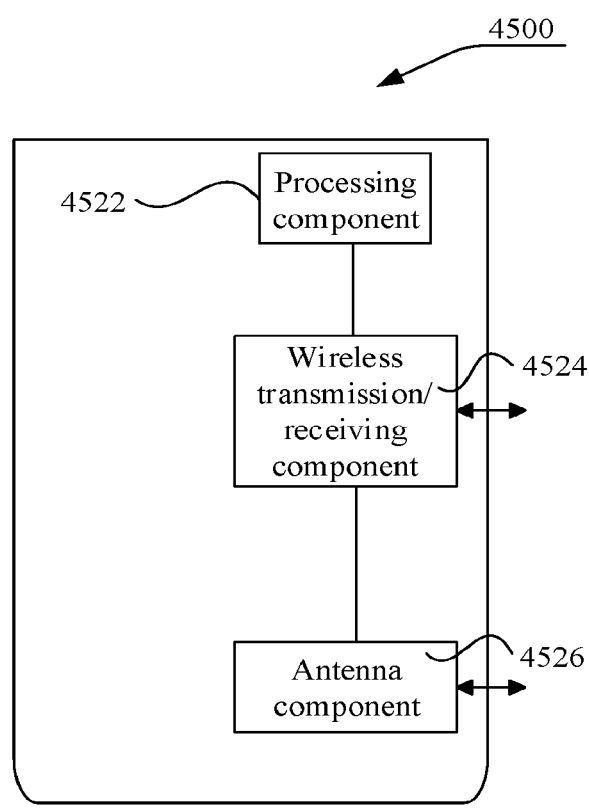
FIG. 45 is a schematic structure diagram of a device of transmission configuration, according to an exemplary embodiment.

As illustrated in FIG. 45, FIG. 45 is a structure diagram of a device of transmission configuration, according to an exemplary embodiment. The device 4500 may be provided as a base station. Referring to FIG. 45, the device 4500 includes a processing component 4522, a wireless transmission/receiving component 4524, an antenna component 4526 and a wireless interface-specific signal processing part, and the processing component 4522 may further include one or more processors.

One processor in the processing component 4522 may be configured to execute any of the above methods of transmission configuration.

It should be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method of transmission configuration that is applied to a terminal, comprising:
   determining a designated message that is configured to trigger a base station to configure a Transmission Configuration Indication (TCI) state set for the terminal; and
   transmitting the designated message to the base station in a random access process, such that the base station configures the TCI state set according to the designated message;
   wherein the method further comprises:
   receiving a fourth message transmitted by the base station and configured to represent that contention resolution is successful; and
   receiving Radio Resource Control (RRC) signaling transmitted by the base station, the RRC signaling comprising a first TCI state set for Physical Downlink Control Channel (PDCCH) reception and/or a second TCI state set for Physical Downlink Shared Channel (PDSCH) reception, which are/is configured for the terminal by the base station, wherein the first TCI state set is used to determine a TCI state identifier for PDCCH reception and a first corresponding relationship between the TCI state identifier for PDCCH reception and at least one of an Synchronization Signal Block (SSB) identifier or a Channel State Information Reference Signals (CSI-RS) identifier, and the second TCI state set is used to determine a TCI state identifier for PDCCH reception and a second corresponding relationship between the TCI state identifier for PDSCH reception and at least one of an SSB identifier or a CSI-RS identifier.

2. The method of claim 1, wherein determining the designated message comprises:
   performing detection within a designated detection window in order to obtain one or more first SSBs capable of triggering random access; and
   determining a first message corresponding to a first SSB and configured to initiate random access as the designated message.

3. The method of claim 2, wherein performing detection within the designated detection window in order to obtain the one or more first SSBs capable of triggering random access comprises:
   determining the SSB as the first SSB when any SSB meeting a designated received power condition is detected within the designated detection window, wherein an SSB detected at the earliest time within the designated detection window and meeting the designated received power condition is determined as an earliest SSB.

4. The method of claim 2, wherein performing detection within the designated detection window in order to obtain the one or more first SSBs capable of triggering random access comprises:
   determining an earliest SSB as the first SSB when an earlies SSB meeting a designated received power condition is detected within the designated detection window;
   calculating a difference value between received power of the earliest SSB and a designated offset value when any other SSB meeting the designated received power condition is detected within the designated detection window; and
   determining the other SSB as the first SSB when received power of the other SSB is greater than the difference value.

5. The method of claim 3, further comprising:
   stopping SSB detection when it is detected that a first designated stopping condition is met, wherein the first designated stopping condition includes at least one of:
   all SSBs designated by the base station and that need to be detected are detected;
   a designated number of first SSBs are detected; or
   there is a need to start monitoring a random access feedback corresponding to random access which is initiated by the earliest SSB.

6. The method of claim 2, wherein determining the designated message further comprises:
receiving a second message transmitted by the base station for performing random access feedback for a second SSB, the second SSB being any one of the first SSBs;
measuring one or more first CSI-RSs corresponding to the second SSB based on a set measurement rule in order to obtain a first measurement report; and
adding the first measurement report to a first set message which is configured to represent contention resolution, and determining the first set message as the designated message.

7. The method of claim 2, wherein determining the designated message further comprises:
selecting one or more third SSBs from the first SSBs based on a set selection rule;
measuring one or more second CSI-RSs corresponding to a third SSB according to a set measurement rule in order to obtain a second measurement report; and
adding the second measurement report to a second set message which is configured to represent contention resolution, and determining the second set message as the designated message.

8. The method of claim 1, wherein determining the designated message comprises:
measuring one or more fourth SSBs designated by the base station for measurement and one or more third CSI-RSs corresponding to a fourth SSB based on a set measurement rule in order to obtain a third measurement report; and
adding the third measurement report to a third set message which is configured to represent contention resolution, and determining the third set message as the designated message.

9. The method of claim 2, wherein determining the designated message further comprises:
detecting one or more fourth CSI-RSs capable of triggering random access within the designated detection window; and
determining a first message corresponding to a fourth CSI-RS and configured to initiate random access as the designated message.

10. The method of claim 9, wherein detecting the one or more fourth CSI-RSs capable of triggering random access within the designated detection window comprises:
detecting an earliest SSB meeting a first designated received power condition within the designated detection window;
calculating a first difference value between received power of the earliest SSB and the designated offset value when any fifth CSI-RS meeting a second designated received power condition is detected within the designated detection window;
regulating received power of the fifth CSI-RS based on a designated transmitted power difference value between an SSB and a CSI-RS in order to obtain regulated received power; and
determining the fifth CSI-RS as the fourth CSI-RS when the regulated received power is greater than the first difference value.

11. The method of claim 10, further comprising:
stopping SSB detection and CSI-RS detection when it is detected that a second designated stopping condition is met, wherein the second designated stopping condition comprises at least one of:
all SSBs and CSI-RSs designated by the base station and that need to be detected are detected;
a designated number of first SSBs and fourth CSI-RSs are detected; or
there is a need to start monitoring a random access feedback corresponding to random access which is initiated by the earliest SSB.

12. The method of claim 9, wherein determining the designated message further comprises:
determining one or more fifth SSBs and one or more sixth CSI-RSs based on the set measurement rule, and measuring the fifth SSBs and the sixth CSI-RSs to obtain a fourth measurement report; and
adding the fourth measurement report to a fourth set message which is configured to represent contention resolution, and determining the fourth set message as the designated message.

13. A method of transmission configuration that is applied to a base station, comprising:
receiving a designated message transmitted by a terminal in a random process, the designated message being a message transmitted by the terminal to trigger the base station to configure a Transmission Configuration Indication (TCI) state set; and
configuring a first TCI state set for Physical Downlink Control Channel (PDCCH) reception and/or a second TCI state set for Physical Downlink Shared Channel (PDSCH) reception for the terminal according to the designated message, wherein the first TCI state set is used to determine a TCI state identifier for PDCCH reception and a first corresponding relationship between the TCI state identifier for PDCCH reception and at least one of an Synchronization Signal Block (SSB) identifier or a Channel State Information Reference Signals (CSI-RS) identifier, and the second TCI state set is used to determine a TCI state identifier for PDCCH reception and a second corresponding relationship between the TCI state identifier for PDSCH reception and at least one of an SSB identifier or a CSI-RS identifier;
wherein the method further comprises:
transmitting a fourth message, which is configured to represent that contention resolution is successful, to the terminal; and
adding the first TCI state set and/or the second TCI state set to Radio Resource Control (RRC) signaling, and transmitting the RRC signaling to the terminal.

14. A device of transmission configuration that is applied to a terminal, comprising:
a processor; and
a memory configured to store instructions executable for the processor,
wherein the processor is configured to:
determine a designated message that is configured to trigger a base station to configure a Transmission Configuration Indication (TCI) state set for the terminal; and
transmit the designated message to the base station in a random access process, such that the base station configures the TCI state set based on the designated message;
wherein the processor is configured to:
receive a fourth message transmitted by the base station and configured to represent that contention resolution is successful; and
receive Radio Resource Control (RRC) signaling transmitted by the base station, the RRC signaling comprising a first TCI state set for Physical Downlink Control Channel (PDCCH) reception and/or a second TCI state set for Physical Downlink Shared Channel (PDSCH) reception, which are/is configured for the terminal by the base station, wherein the first TCI state set is used to determine a TCI state identifier for PDCCH reception and a first corresponding relationship between the TCI state identifier for PDCCH reception and at least one of an Synchronization Signal Block (SSB) identifier or a Channel State Information Reference Signals (CSI-RS) identifier, and the second TCI state set is used to determine a TCI state identifier for PDCCH reception and a second corresponding relationship between the TCI state identifier for PDSCH reception and at least one of an SSB identifier or a CSI-RS identifier.

15. The device of claim 14, wherein the processor is configured to:
  perform detection within the designated detection window in order to obtain one or more first SSBs capable of triggering random access; and
  determine a first message corresponding to a first SSB and configured to initiate random access as the designated message.

16. The device of claim 15, wherein the processor is configured to:
  determine the SSB as the first SSB when any SSB meeting a designated received power condition is detected within the designated detection window, wherein an SSB detected at the earliest time within the designated detection window and meeting the designated received power condition is determined as an earliest SSB.

17. The device of claim 15, wherein the processor is configured to:
  determine an earliest SSB as the first SSB when an earliest SSB meeting a designated received power condition is detected within the designated detection window;
  calculate a difference value between received power of the earliest SSB and a designated offset value when any other SSB meeting the designated received power condition is detected within the designated detection window; and
  determine the other SSB as the first SSB when received power of the other SSB is greater than the difference value.

18. The device of claim 16, wherein the processor is further configured to:
  stop SSB detection when it is detected that a first designated stopping condition is met, wherein the first designated stopping condition comprises at least one of:
  all SSBs designated by the base station and that need to be detected are detected;
  a designated number of first SSBs are detected; or
  there is a need to start monitoring a random access feedback corresponding to random access which is initiated by the earliest SSB.

19. The device of claim 15, wherein the processor is further configured to:
  receive a second message transmitted by the base station for performing random access feedback for a second SSB, the second SSB being any one of the first SSBs;
  measure one or more first CSI-RSs corresponding to the second SSB based on a set measurement rule to obtain a first measurement report; and
  add the first measurement report to a first set message which is configured to represent contention resolution, and determine the first set message as the designated message.

20. A device of transmission configuration that is applied to a base station, comprising:
  a processor; and
  a memory configured to store instructions executable for the processor,
  wherein the processor is configured to execute the method of transmission configuration of claim 13.

* * * * *

UNITED STATES PATENT AND TRADEMARK OFFICE
CERTIFICATE OF CORRECTION

PATENT NO. : 11,838,883 B2  
APPLICATION NO. : 17/261333  
DATED : December 5, 2023  
INVENTOR(S) : Mingju Li Page 1 of 1

It is certified that error appears in the above-identified patent and that said Letters Patent is hereby corrected as shown below:

In the Claims

In Claim 1, Column 42, Line 18, please change "PDCCH" to -- PDSCH --.

In Claim 4, Column 42, Line 47, please change "earlies" to -- earliest --.

In Claim 13, Column 44, Line 37, please change "PDCCH" to -- PDSCH --.

In Claim 14, Column 45, Line 13, please change "PDCCH" to -- PDSCH --.

Signed and Sealed this  
Twenty-ninth Day of April, 2025

Coke Morgan Stewart  
*Acting Director of the United States Patent and Trademark Office*